(12) United States Patent
Nonaka et al.

(10) Patent No.: US 8,135,130 B2
(45) Date of Patent: Mar. 13, 2012

(54) DATA ENCRYPTION APPARATUS, DATA CONVERTING METHOD, DATA CONVERTING PROGRAM, RECORDING MEDIUM AND INTEGRATED CIRCUIT

(75) Inventors: Masao Nonaka, Osaka (JP); Kaoru Yokota, Hyogo (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 12/095,684

(22) PCT Filed: Jun. 19, 2007

(86) PCT No.: PCT/JP2007/062265
§ 371 (c)(1),
(2), (4) Date: May 30, 2008

(87) PCT Pub. No.: WO2007/148665
PCT Pub. Date: Dec. 27, 2007

(65) Prior Publication Data
US 2010/0150346 A1   Jun. 17, 2010

(30) Foreign Application Priority Data
Jun. 23, 2006   (JP) .................................. 2006-173322

(51) Int. Cl.
*H04L 29/06* (2006.01)
(52) U.S. Cl. ................ 380/29; 380/28; 380/30; 380/37; 380/42; 380/43; 380/265; 713/150; 713/160; 713/189; 713/190
(58) Field of Classification Search .................... 380/37, 380/265, 28–30, 42–43, 36; 713/150, 160; 713/189–190
See application file for complete search history.

(56) References Cited

U.S. PATENT DOCUMENTS
4,850,019 A   7/1989   Shimizu et al.
(Continued)

FOREIGN PATENT DOCUMENTS
| JP | 62-113191 | 5/1987 |
| JP | 2001-42766 | 2/2001 |
| JP | 2001-236017 | 8/2001 |
| JP | 2002-518713 | 6/2002 |

OTHER PUBLICATIONS

Federation Information Processing Standards Publication 197, NPL Document Announcing the Advanced Encryption Standard (AES), Nov. 26, 2001.*

(Continued)

*Primary Examiner* — Taghi Arani
*Assistant Examiner* — Josnel Jeudy
(74) *Attorney, Agent, or Firm* — Wenderoth Lind & Ponack, L.L.P.

(57) ABSTRACT

The data encryption apparatus with a data converting unit splits 256-bit input data into 32-bit data blocks A1, B1, A2, and B2. A first combining unit performs an exclusive OR operation on A1 and B1, and on A2 and B2. A first scramble unit branches A1, A2, and the results of the exclusive OR operations (C1 and C2) into three data blocks each, and for each set of three data blocks, shift-rotates two of the data blocks and combines the shifted data blocks with the remaining data block. A second combining unit performs an exclusive OR operation on D1 and E2, and on D2 and E1, which are the results of the processing performed by the first scramble unit. A block concatenating unit concatenates the results of the operations performed by the second combining unit. A second scramble unit branches the concatenated data into three data blocks, shift-rotates two of the data blocks and combines the two shifted data blocks with the remaining data block.

11 Claims, 13 Drawing Sheets

U.S. PATENT DOCUMENTS

| | | | |
|---|---|---|---|
| 5,351,299 A * | 9/1994 | Matsuzaki et al. | 380/37 |
| 5,623,549 A * | 4/1997 | Ritter | 380/37 |
| 5,724,428 A | 3/1998 | Rivest | |
| 5,896,406 A * | 4/1999 | Berry et al. | 714/801 |
| 6,304,657 B1 | 10/2001 | Yokota et al. | |
| 6,490,353 B1 * | 12/2002 | Tan | 380/37 |
| 7,133,522 B2 * | 11/2006 | Lambert | 380/28 |
| 2002/0025035 A1 | 2/2002 | Rivest et al. | |

OTHER PUBLICATIONS

International Search Report issued Aug. 28, 2007 in the International (PCT) Application of which the present application is the U.S. National Stage.

* cited by examiner

DATA ENCRYPTION APPARATUS, DATA CONVERTING METHOD, DATA CONVERTING PROGRAM, RECORDING MEDIUM AND INTEGRATED CIRCUIT

BACKGROUND OF THE INVENTION

1. Technical Field

The present invention relates to a data encryption apparatus.

2. Background Art

A data encryption apparatus is used when, for example, encrypting content such as digitally converted music and video and distributing the encrypted content. There is demand for a high level of security when distributing content etc. To increase the level of security, it is effective to increase the degree to which the data targeted for distribution is scrambled.

For example, patent document 1 discloses a data encryption method for realizing high scrambling performance.

In the technology of patent document 1, input data is scrambled by splitting the input data into a plurality of blocks of the same data length, performing at least one of an exclusive OR operation, an addition operation, and a remainder operation using the data blocks, performing substitution processing (conversion processing using a table) on the results, and concatenating the data resulting from the substitution processing.

Patent document 1: Japanese Patent Application Publication No. S62-113191

However, the above conventional technology requires a large number of substitution processes in order to realize high scrambling performance, and realizing this large number of substitution processes with hardware requires a large number of gates, which makes it impossible to reduce the hardware gate scale.

In view of the above problem, an aim of the present invention is to provide a data encryption apparatus that realizes high scrambling performance while reducing the hardware gate scale over conventional technology.

SUMMARY OF THE INVENTION

In order to solve the above problem, the present invention is a data encryption apparatus including a data converting unit operable to convert n-bit input data into n-bit output data, the data converting unit including: an acquisition unit operable to acquire the input data, the input data being constituted from a first block group including one or more data blocks and a second block group including one or more data blocks; a first combining unit operable to generate a third block group with use of the second block group by, for each of one or more of the data blocks in the second block group, combining the data block with a branched data block generated by branching a data block from among the one or more data blocks in the first block group; a scramble unit operable to generate a fourth block group with use of the first block group and generate a fifth block group with use of the third block group by, for each of one or more of the data blocks in the first block group and each of one or more of the data blocks in the third block group, branching said data block to generate two or more branched data blocks, shift-rotating each branched data block to generate a shifted data block, and combining the shifted data blocks together; a second combining unit operable to generate a sixth block group with use of the fourth block group by, for each of one or more of the data blocks in the fourth block group, combining the data block with a branched data block generated by branching a data block from among the one or more data blocks in the fifth block group; and an output unit operable to output the output data, the output data being constituted from the data blocks in the fifth block group and the data blocks in the sixth block group.

Note that in this description, encryption processing does not exclude decryption, but instead refers to a broad concept including both encryption and decryption.

Also, in this description, shift-rotating refers to a concept of 0-bit or more shift-rotating, that is to say, a case of not performing shift-rotating is included.

According to the above structure, the data encryption apparatus of the present invention performs data scrambling with a small hardware scale by branching, shift-rotating, and combining, thereby enabling reducing the hardware gate scale over conventional technology that uses a substitution table.

Also, the scramble unit may branch said data block to generate an odd number of data blocks, and shift-rotate each of the odd number of data blocks by a different number of bits.

According to this structure, the conversion performed by the scramble unit is bijective conversion, thereby improving scrambling performance.

Also, the number of data blocks in the first block group may be equal to the number of data blocks in the second block group, and for each of all data blocks in the second block group, the first combining unit may combine the data block with the branched data block generated by branching the data block from among the one or more data blocks in the first block group.

According to this structure, all of the data blocks are combined with other data blocks, thereby making it difficult to infer the pre-combining data.

Also, for each of all data blocks in the first block group and each of all data blocks in the third block group, the scramble unit may branch the data block to generate two or more branched data blocks.

According to this structure, all of the data blocks are scrambled, thereby making it difficult to infer the pre-scrambling data.

Also, for each of all data blocks in the fourth block group, the second combining unit may combine the data block with the branched data block generated by branching the data block from among the one or more data blocks in the fifth block group.

According to this structure, all of the data blocks are combined with other data blocks, thereby making it difficult to infer the pre-combining data.

Also, in the second combining unit, two data blocks in the fifth block group that are to be combined with respective data blocks in the fourth block group may have been generated with use of different data blocks.

This structure enables certain data in the input data to have a wide range of influence on the scrambling of other data in the input data.

Also, the data converting unit may further include a key combining unit operable to combine the input data acquired by the acquisition unit with pre-provided key data, and output the input data combined with the key data to the first combining unit.

Also, the key combining unit may combine the input data and the key data together by one of an exclusive OR operation and an arithmetic addition operation.

According to this structure, input data is combined with other data in advance to make it difficult to infer the input data, and the input data is prevented from even partially being processed as plain text, thereby increasing confidentiality.

Also, the data converting unit may further include a final scramble unit operable to, before the output unit outputs the output data, branch the output data to generate two branched output data blocks, shift-rotate each branched output data block to generate a shifted output data block, and combine the shifted output data blocks together.

This structure further increases the degree of scrambling, thereby making it further difficult to infer the input data.

The present invention is also a data converting method used in a data converting unit that is included in a data encryption apparatus and converts n-bit input data into n-bit output data, the data converting method including the steps of: acquiring the input data, the input data being constituted from a first block group including one or more data blocks and a second block group including one or more data blocks; generating a third block group with use of the second block group by, for each of one or more of the data blocks in the second block group, combining the data block with a branched data block generated by branching a data block from among the one or more data blocks in the first block group; generating a fourth block group with use of the first block group and generating a fifth block group with use of the third block group by, for each of one or more of the data blocks in the first block group and each of one or more of the data blocks in the third block group, branching said data block to generate two or more branched data blocks, shift-rotating each branched data block to generate a shifted data block, and combining the shifted data blocks together; generating a sixth block group with use of the fourth block group by, for each of one or more of the data blocks in the fourth block group, combining the data block with a branched data block generated by branching a data block from among the one or more data blocks in the fifth block group; and outputting the output data, the output data being constituted from the data blocks in the fifth block group and the data blocks in the sixth block group.

The present invention is also a data converting program used in a data converting unit that is included in a data encryption apparatus and converts n-bit input data into n-bit output data, the data converting program including the steps of: acquiring the input data, the input data being constituted from a first block group including one or more data blocks and a second block group including one or more data blocks; generating a third block group with use of the second block group by, for each of one or more of the data blocks in the second block group, combining the data block with a branched data block generated by branching a data block from among the one or more data blocks in the first block group; generating a fourth block group with use of the first block group and generating a fifth block group with use of the third block group by, for each of one or more of the data blocks in the first block group and each of one or more of the data blocks in the third block group, branching said data block to generate two or more branched data blocks, shift-rotating each branched data block to generate a shifted data block, and combining the shifted data blocks together; generating a sixth block group with use of the fourth block group by, for each of one or more of the data blocks in the fourth block group, combining the data block with a branched data block generated by branching a data block from among the one or more data blocks in the fifth block group; and outputting the output data, the output data being constituted from the data blocks in the fifth block group and the data blocks in the sixth block group.

The present invention is also a recording medium having the data converting program recorded thereon.

The above structures enable converting data without the use of a substitution table.

The present invention is also an integrated circuit used in a data encryption apparatus that includes a data converting unit that converts n-bit input data into n-bit output data, the integrated circuit including: an acquisition unit operable to acquire the input data, the input data being constituted from a first block group including one or more data blocks and a second block group including one or more data blocks; a first combining unit operable to generate a third block group with use of the second block group by, for each of one or more of the data blocks in the second block group, combining the data block with a branched data block generated by branching a data block from among the one or more data blocks in the first block group; a scramble unit operable to generate a fourth block group with use of the first block group and generate a fifth block group with use of the third block group by, for each of one or more of the data blocks in the first block group and each of one or more of the data blocks in the third block group, branching said data block to generate two or more branched data blocks, shift-rotating each branched data block to generate a shifted data block, and combining the shifted data blocks together; a second combining unit operable to generate a sixth block group with use of the fourth block group by, for each of one or more of the data blocks in the fourth block group, combining the data block with a branched data block generated by branching a data block from among the one or more data blocks in the fifth block group; and an output unit operable to output the output data, the output data being constituted from the data blocks in the fifth block group and the data blocks in the sixth block group.

Data scrambling is performed with a small hardware scale by branching, shift-rotating, and combining, thereby enabling reducing the hardware gate scale over conventional technology that uses a substitution table.

Figure 1:
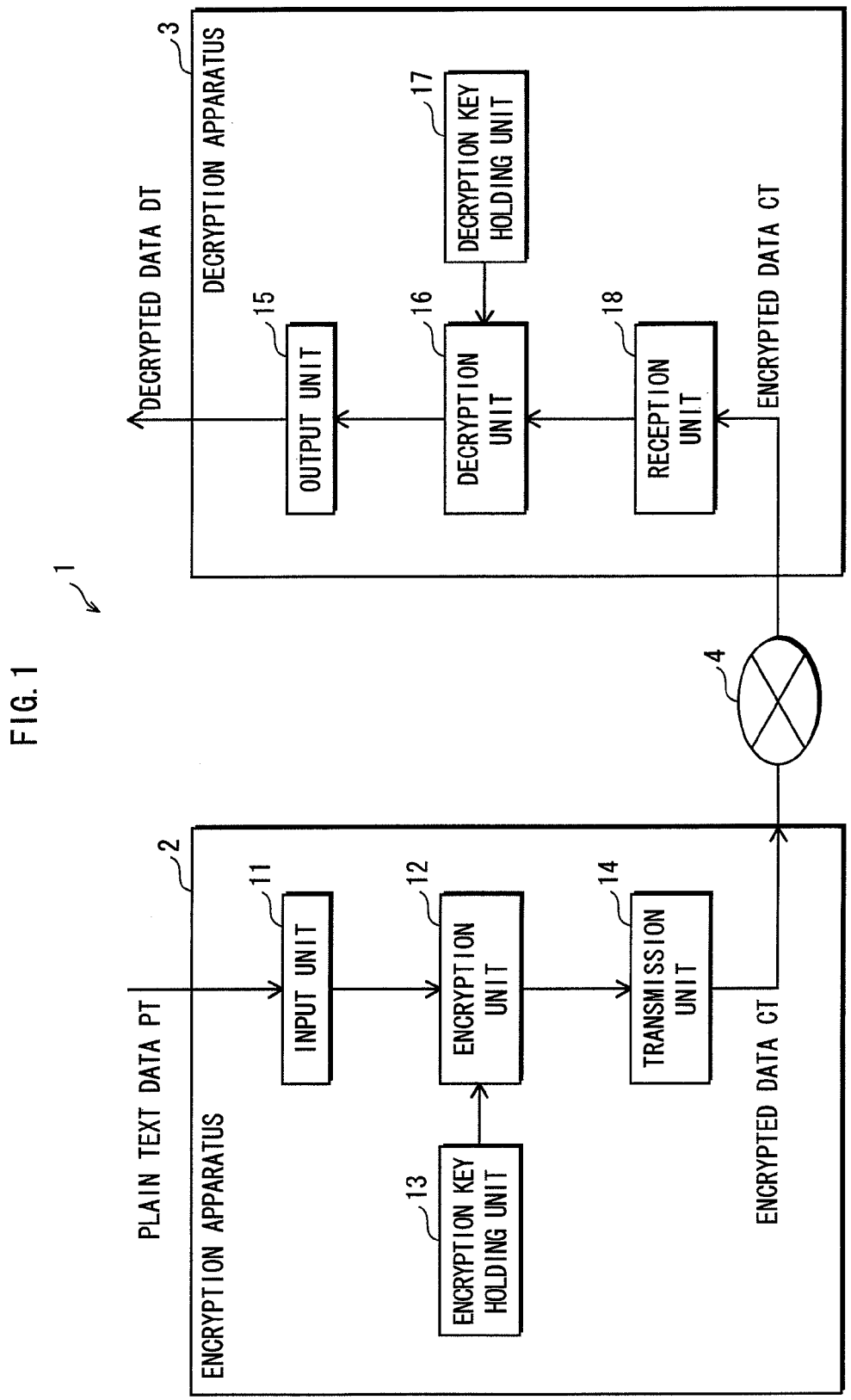
FIG. 1 shows the structure of an encrypted communication system pertaining to an embodiment of the present invention.

DESCRIPTION OF THE CHARACTERS 1 encrypted communication system
2 encryption apparatus 3 decryption apparatus
4 communication channel
11 input unit
12 encryption unit
13 encryption key holding unit
14 transmission unit
15 output unit
16 decryption unit
17 decryption key holding unit
18 reception unit
21 key generation request unit
22 key control unit
23 data scramble unit
24 count control unit
25 data switching unit
31 split unit
32 data converting unit
33 exclusive OR unit
33 decryption key holding unit
34 concatenating unit
41 addition unit
42 block split unit
43 first combining unit
44 first scramble unit
45 second combining unit
46 block concatenating unit
47 second scramble unit
51 exclusive OR unit
52 exclusive OR unit
55 to 62 bit rotation unit
63 to 66 exclusive OR unit
71, 72 exclusive OR unit
73, 74 bit rotation unit
75 exclusive OR unit
81 key generation request unit
82 key control unit
83 data scramble unit
84 count control unit
85 data switching unit

DETAILED DESCRIPTION OF THE INVENTION

The following describes an encrypted communication system pertaining to this embodiment of the present invention.

FIG. 1 shows the structure of an encrypted communication system 1 in which an encryption apparatus 2 and a decryption apparatus 3 are connected via a communication channel 4.

The encryption apparatus 2 receives, from an external device, an input of plain text data PT, which is a message that is to be kept confidential, encrypts the plain text data PT to obtain encrypted data CT, and transmits the encrypted data CT to the decryption apparatus 3 via the communication channel 4.

The encryption apparatus 2 performs encryption processing without conversion by substitution, and therefore the hardware scale of the portion that performs encryption processing is smaller than in conventional technology.

The decryption apparatus 3 receives, via the communication channel 4, the encrypted data CT that was transmitted by the encryption apparatus 2, decrypts the encrypted data CT to generate decrypted data DT, and outputs the decrypted data DT to an external source.

If the encrypted text CT is decrypted normally by the decryption apparatus 3, the decrypted data DT and the plain text data PT will match. Since the data that the encryption apparatus 2 transmits to the decryption apparatus 3 via the communication channel 4 is encrypted, even if an unauthorized user eavesdrops on the communication channel 4, the unauthorized user cannot find out the plain text data PT, which is a message that is to be kept confidential.

The communication channel 4 is for the transfer of data. Examples of the communication channel 4 include the Internet, a telephone line, a dedicated line, and a USB cable.

The following describes details of the constituent elements of the encrypted communication system 1.

1. Structure 1.1. Structure of the Encryption Apparatus 2

As shown in FIG. 1, the encryption apparatus 2 includes an input unit 11, an encryption unit 12, an encryption key holding unit 13, and a transmission unit 14.

1.1.1. Input Unit 11, Encryption Key Holding Unit 13, Transmission Unit 14

The input unit 11 receives an input of the 64-bit plain text data PT from an external device, and outputs the input plain text data PT to the encryption unit 12. In the present embodiment, the input unit 11 includes a keyboard and a computer mouse. A user in possession of the encryption apparatus 2 inputs the plain text data PT, which is a message to be kept confidential, with use of the keyboard and computer mouse.

The encryption key holding unit 13 holds a 256-bit encryption key EK. The value of the encryption key EK is the same as the value of a decryption key DK held by a decryption key holding unit 17 included in the decryption apparatus 3 that is described later.

The transmission unit 14 receives the encrypted data CT from the encryption unit 12, and transmits the encrypted data CT to the decryption apparatus 3 via the communication channel 4.

1.1.2. Encryption Unit 12

The encryption unit 12 receives the plain text data PT, acquires the encryption key EK from the encryption key holding unit 13, encrypts the plain text data PT with use of the encryption key EK to obtain the encrypted data CT, and outputs the encrypted data CT to the transmission unit 14.

Figure 2:
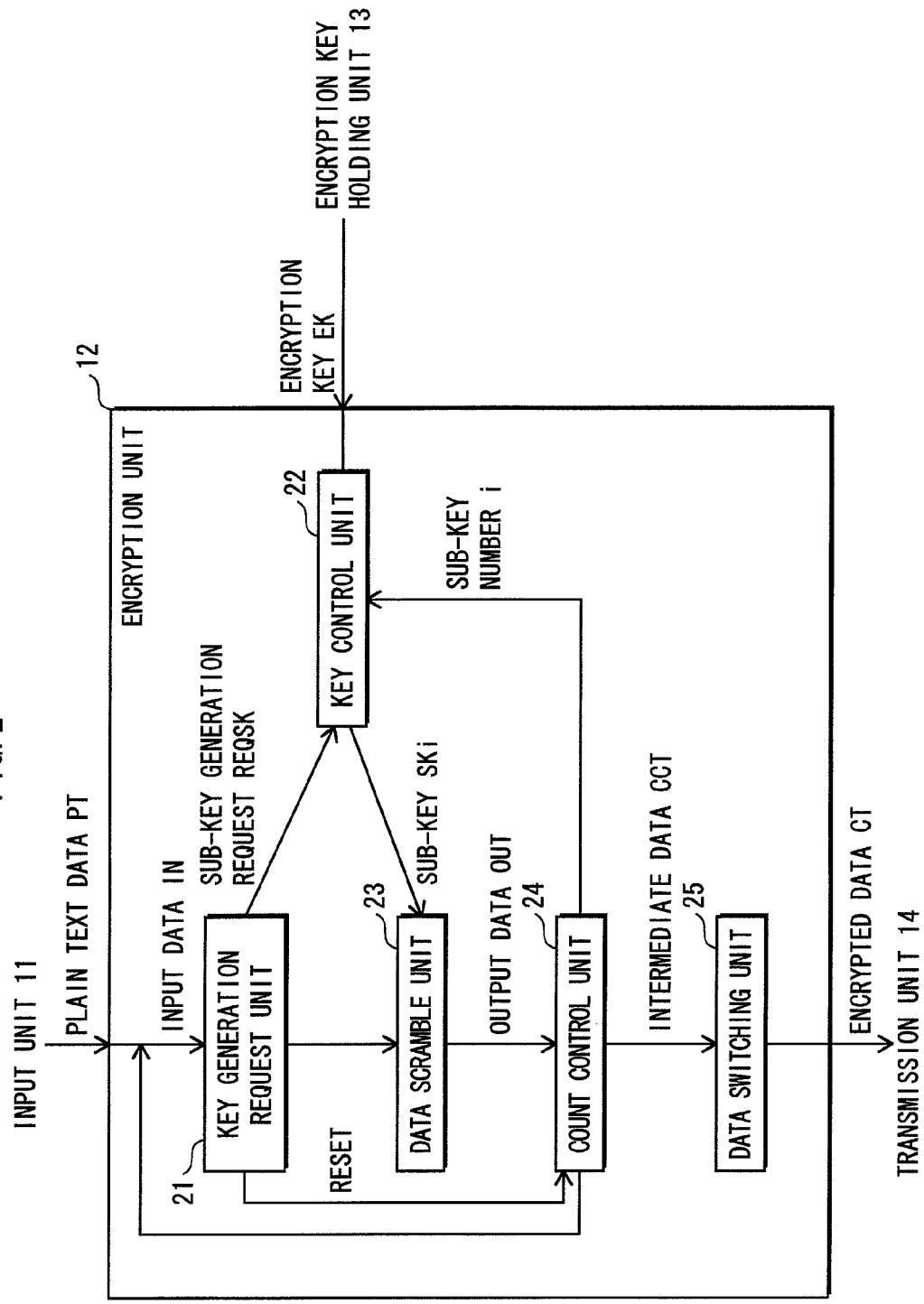
FIG. 2 shows the structure of an encryption unit pertaining to the embodiment of the present invention.

As shown in FIG. 2, the encryption unit 12 includes a key generation request unit 21, a key control unit 22, a data scramble unit 23, a count control unit 24, and a data switching unit 25. The encryption unit 12 is specifically a dedicated microcomputer etc. that includes a plurality of function units. The function units are realized by programs stored in the microcomputer. Alternatively, each function unit may be an independent microcomputer.

1.1.2.1. Key Generation Request Unit 21, Key Control Unit 22, Count Control Unit 24, Data Switching Unit 25

The key generation request unit 21 receives the plain text data PT from the input unit 11 as input data IN, outputs a sub-key generation request REQSK to the key control unit 22, outputs a reset signal to the count control unit 24, and outputs the input data IN to the data scramble unit 23. Upon receiving input data IN from the count control unit 24, the key generation request unit 21 outputs the received input data IN to the data scramble unit 23.

The key control unit 22 receives the sub-key generation request REQSK from the key generation request unit 21, and thereafter acquires the 256-bit encryption key EK from the encryption key holding unit 13 and splits the encryption key EK into sub-keys SK1 to SK8 that are each 32 bits long. More specifically, the values of the 1st bit to 32nd bit of the encryption key EK become the sub-key SK1, the values of the 33rd bit to the 64th bit of the encryption key EK become the sub-key SK2, and so on until the values of the 225th bit to 256th bit of the encryption key EK become the sub-key SK8.

The key control unit 22 receives a sub-key number whose value is i (where i is a natural number from 1 to 8 inclusive)

from the count control unit 24, and thereafter outputs, to the data scramble unit 23, the sub-key SKi that corresponds to the received sub-key number. For example, if the sub-key number is 1, the key control unit 22 outputs the sub-key SK1 to the data scramble unit 23.

When the data scramble unit 23 has acquired the 64-bit input data IN from the key generation request unit 21, and furthermore has acquired the 32-bit sub-key data SKi from the key control unit 22, the data scramble unit 23 performs scramble processing with use of the sub-key data SKi and the input data IN to obtain 64-bit output data OUT, and outputs the 64-bit output data OUT to the count control unit 24. Details of the data scramble unit 23 are described later.

The count control unit 24 counts the number of times that scramble processing has been performed by the data scramble unit 23, and performs control such that the scramble processing is executed a number of times equal to a predetermined scramble count. In the present embodiment, the predetermined scramble count is 8.

Upon receiving the reset signal from the key generation request unit 21, the count control unit 24 resets the count value to 0, and transmits (count value+1) as the sub-key number to the key control unit 22. Immediately after a reset, the sub-key number that is transmitted to the key control unit 22 is 1.

Upon receiving the output data OUT from the data scramble unit 23, the count control unit 24 increments the count value by one. If the incremented count value is less than the predetermined scramble count, the count control unit 24 outputs (count value+1) as the sub-key number to the key control unit 22, as well as outputs the received output data OUT as input data IN to the key generation request unit 21.

If the incremented count value is equal to the predetermined scramble count, the count control unit 24 refrains from transmitting a sub-key number to the key control unit 22, and outputs the output data OUT, that was received from the data scramble unit 23, to the data switching unit 25 as intermediate data CCT.

Here, the intermediate data CCT is 64-bit data.

The data switching unit 25 acquires the intermediate data CCT, and thereafter switches the values of the least significant 32 bits of the intermediate data CCT and the values of the most significant 32 bits thereof to obtain the encrypted data CT, and outputs the encrypted data CT to the transmission unit 14.

1.1.2.2. Data Scramble Unit 23

Figure 3:
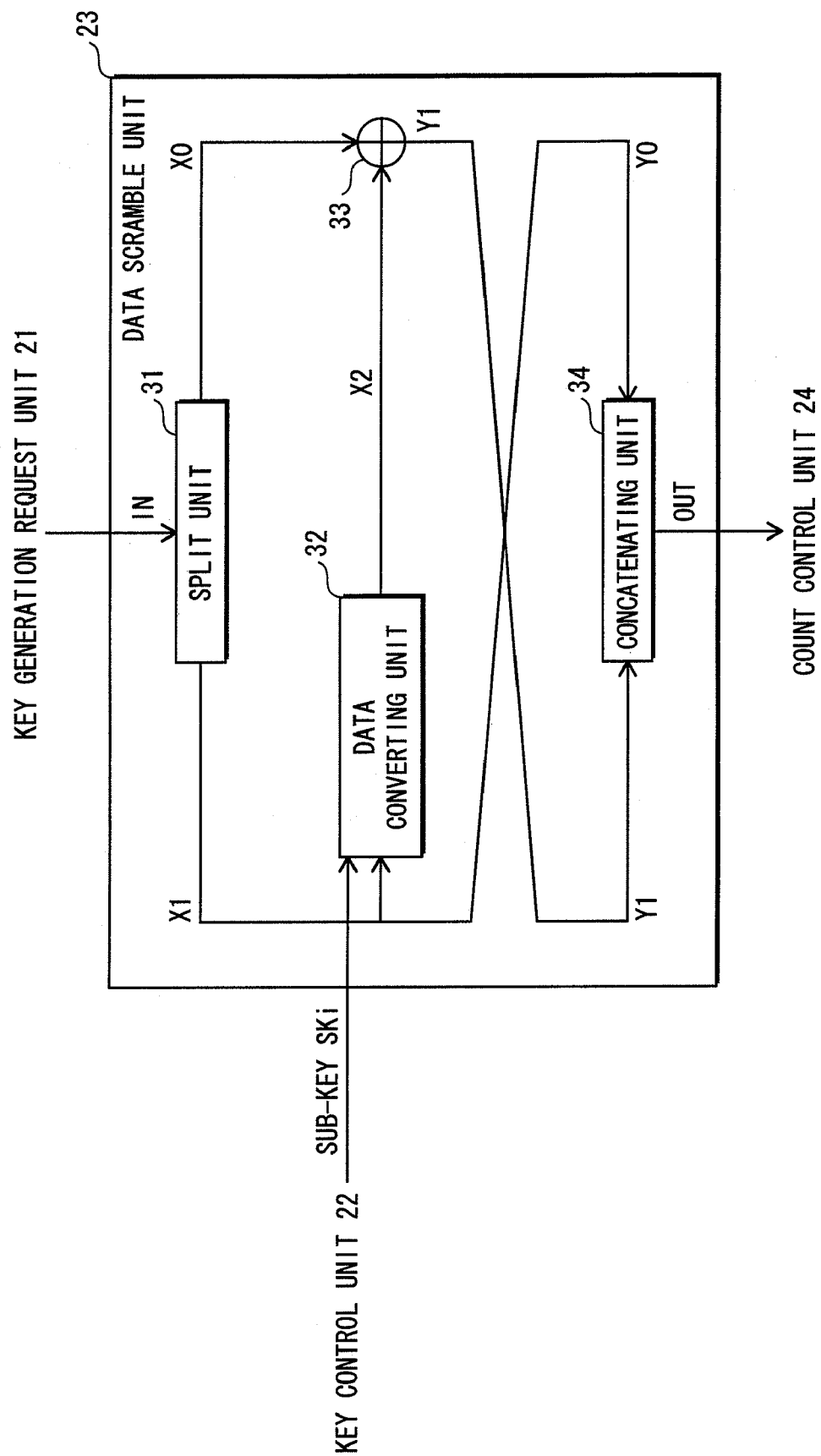
FIG. 3 shows the structure of a data scramble unit pertaining to the embodiment of the present invention.

Below is a description of the data scramble unit 23 with reference to FIG. 3.

The data scramble unit 23 includes a split unit 31, a data converting unit 32, an exclusive OR unit 33, and a concatenating unit 34.

Upon acquiring the 64-bit input data IN, the split unit 31 outputs X0, which is the values of the least significant 32 bits of the input data IN, to the exclusive OR unit 33, and outputs X1, which is the values of the most significant 32 bits of the input data IN, to the data converting unit 32. The split unit 31 also outputs X1 as Y0 to the concatenating unit 34.

The exclusive OR unit 33 performs a bitwise exclusive OR (XOR) operation on X0 acquired from the split unit 31 and X2 acquired from the data converting unit 32 to obtain Y1 (=X0(+)X2), and outputs Y1 to the concatenating unit 34.

Here, the characters "(+)" express an exclusive OR operation.

The concatenating unit 34 acquires Y0 from the split unit 31 and acquires Y1 from the exclusive OR unit 33. The concatenating unit 34 concatenates Y0 and Y1 such that Y0 is the least significant 32 bits and Y1 is the most significant 32 bits, thereby obtaining 64-bit output data OUT, and outputs the 64-bit output data OUT to the count control unit 24.

When the data converting unit 32 has acquired X1 from the split unit 31, and furthermore has acquired the sub-key SKi (where SKi is any of the sub-keys SK1 to SK8) from the key control unit 22, the data converting unit 32 generates 32-bit data X2 by performing data conversion on X1 with use of the acquired sub-key SKi. The data converting unit 32 then outputs the generated X2 to the exclusive OR unit 33.

Figure 4:
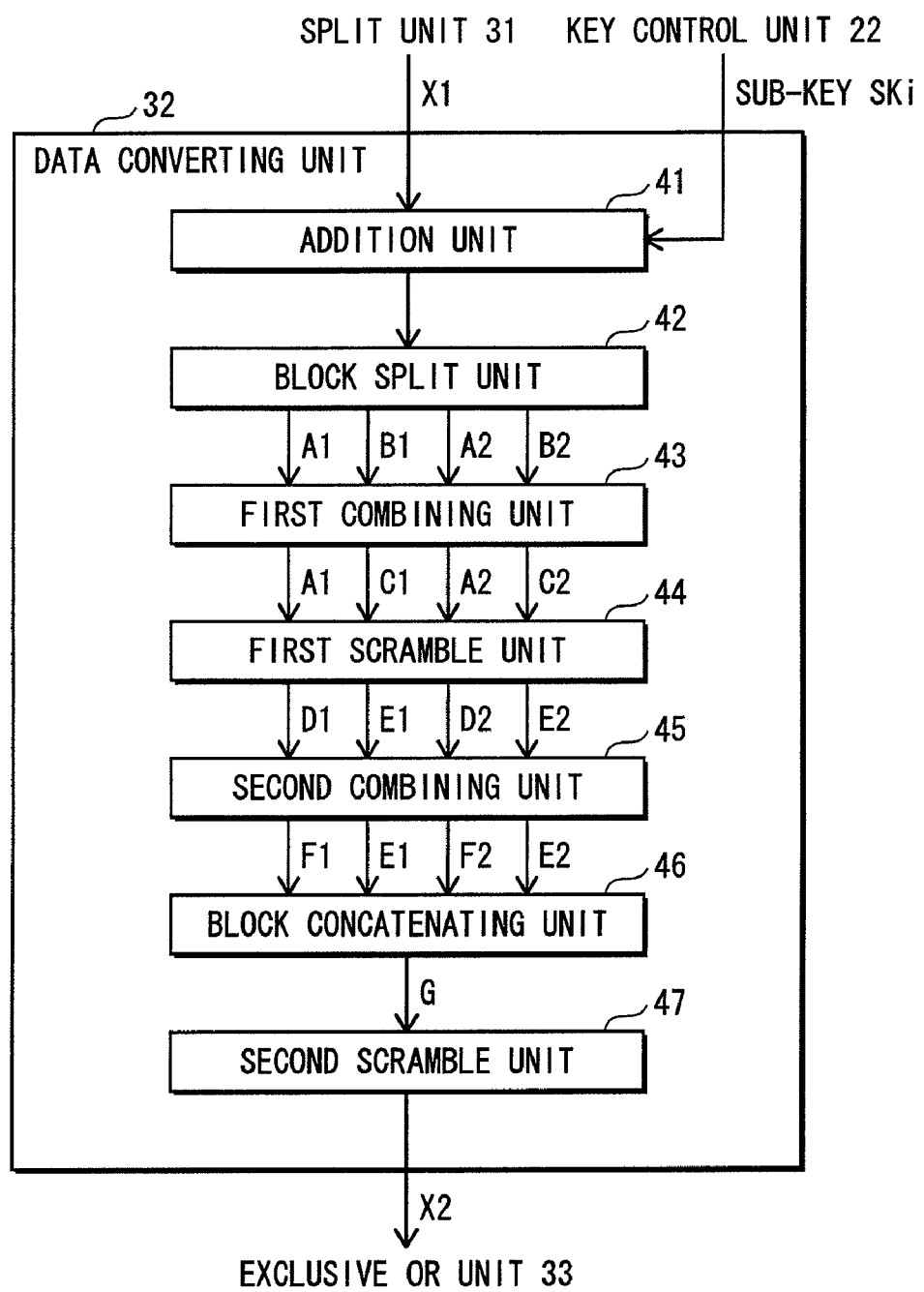
FIG. 4 shows the structure of a data converting unit pertaining to the embodiment of the present invention.

FIG. 4 is a block diagram showing the structure of the data converting unit 32.

The data converting unit 32 includes an addition unit 41, a block split unit 42, a first combining unit 43, a first scramble unit 44, a second combining unit 45, a block concatenating unit 46, and a second scramble unit 47.

The addition unit 41 receives X1 from the split unit 31 and the sub-key SKi from the key control unit 22, and thereafter arithmetically adds X1 and SKi to obtain T (=X1+SKi). The addition unit 41 outputs T to the block split unit 42.

The arithmetic addition referred to here is normal addition with carrying, where the 33rd bit is discarded. In other words, the result of the above arithmetic addition is the result of normal addition with carrying, then divided by $2^{32}$. Here, the mark "^" expresses an exponential operation (e.g., $2^5$=32).

The block split unit 42 receives the aforementioned 32-bit value T from the addition unit 41, divides T into the four blocks A1, B1, A2, and B2, each of which is 8 bits long, and outputs the four blocks to the first combining unit 43. Here, the 1st bit to 8th bit of T becomes B2, the 9th bit to 16th bit of T becomes A2, the 17th bit to 24th bit of T becomes B1, and the 25th bit to 32nd bit of T becomes A1.

Figure 5:
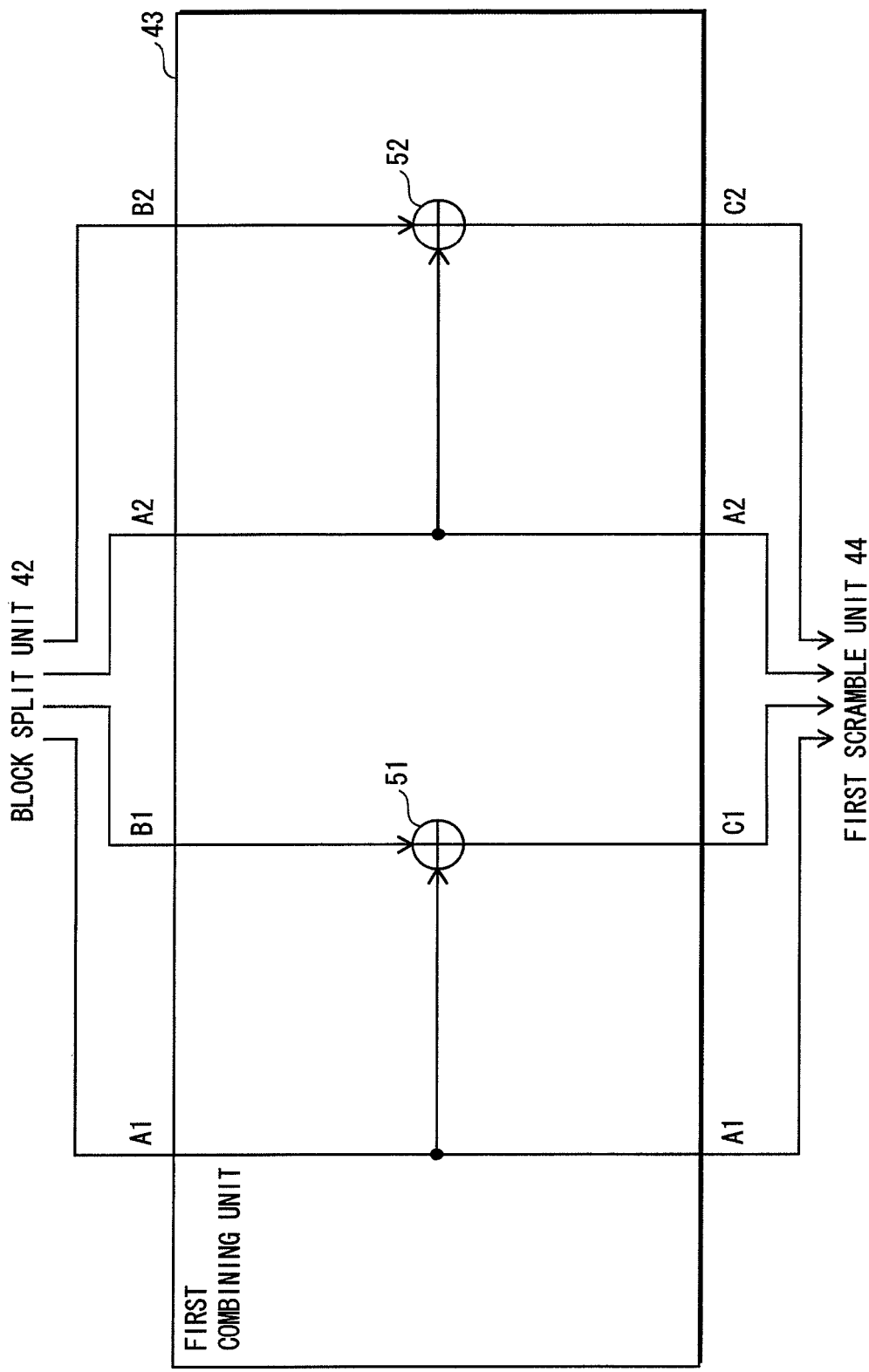
FIG. 5 shows the structure of a first combining unit pertaining to the embodiment of the present invention.

As shown in FIG. 5, the first combining unit 43 includes exclusive OR units 51 and 52, each of which performs an exclusive OR operation.

The first combining unit 43 receives A1, B1, A2, and B2 from the block split unit 42. The first combining unit 43 outputs A1 and A2 unchanged to the first scramble unit 44. Hereinafter, the data block group composed of A1 and A2 that were output unchanged to the first scramble unit 44 is called the first data block group. Also, the first combining unit 43 causes the exclusive OR unit 51 to perform an exclusive OR operation on B1 with A1 to obtain C1 (=B1(+)A1), and outputs C1 to the first scramble unit 44. To that end, the bits of A1 are duplicated in that A1 is provided as an input, respectively, to the first scramble unit 44 and the exclusive OR unit 51. The first combining unit 43 also causes the exclusive OR unit 52 to performs an exclusive OR operation on B2 with A2 to obtain C2 (=B2(+)A2), and outputs C2 to the first scramble unit 44.

Hereinafter, the data block group composed of B1 and B2 on which exclusive OR operations are performed is called the second data block group, and the data block group composed of C1 and C2, which are the results of the exclusive OR operations, is called the third data block group.

Figure 6:
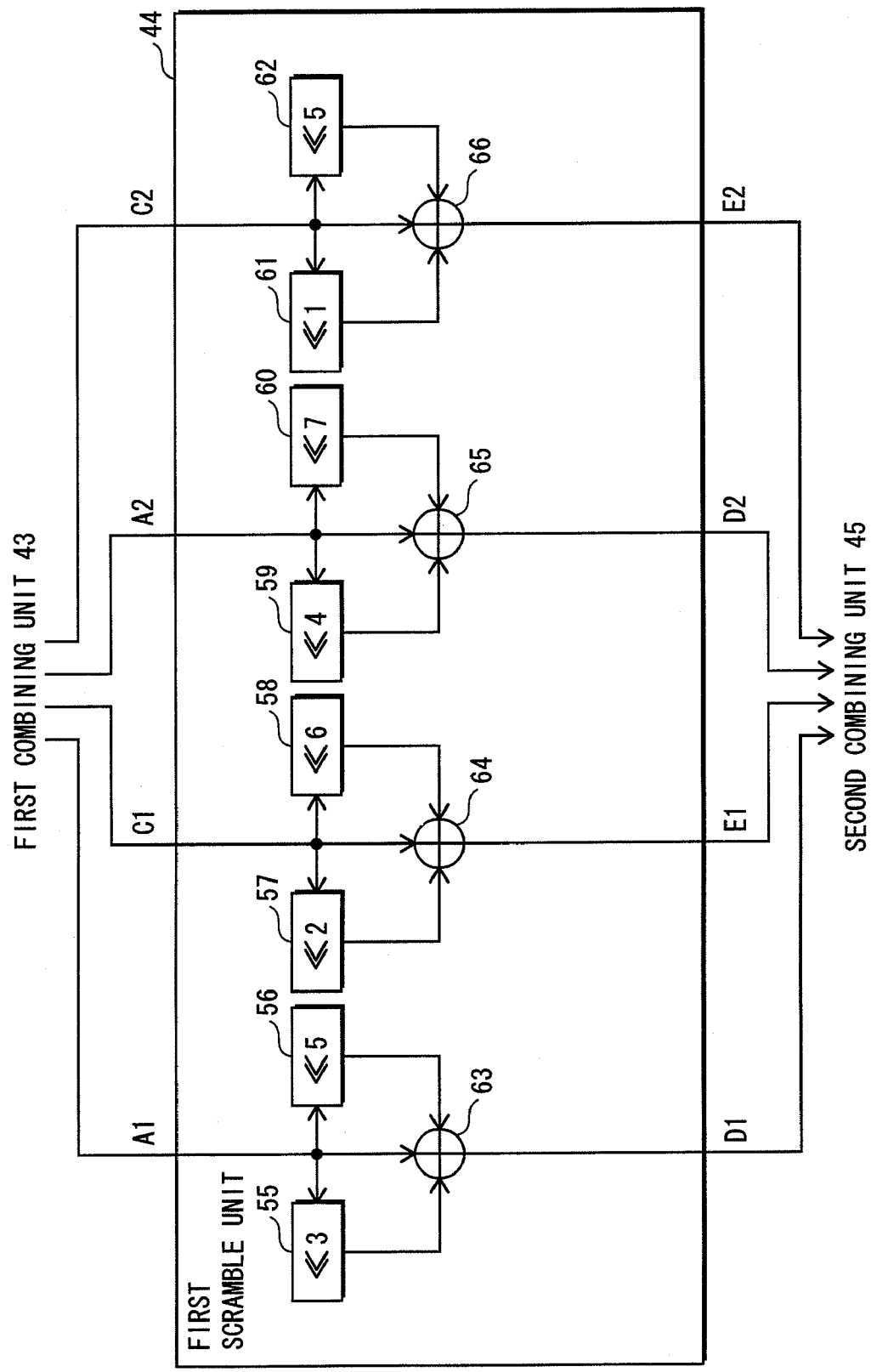
FIG. 6 shows the structure of a first scramble unit pertaining to the embodiment of the present invention.

As shown in FIG. 6, the first scramble unit 44 includes a 3-bit rotation unit 55, a 5-bit rotation unit 56, a 2-bit rotation unit 57, a 6-bit rotation unit 58, a 4-bit rotation unit 59, a 7-bit rotation unit 60, a 1-bit rotation unit 61, a 5-bit rotation unit 62, and exclusive OR units 63 to 66.

In FIG. 6, the characters "<<X" indicate performing X-bit shift-rotating on an input value.

The first scramble unit 44 receives A1, C1, A2, and C2 from the first combining unit 43.

The 3-bit rotation unit 55, 5-bit rotation unit 56, 2-bit rotation unit 57, 6-bit rotation unit 58, 4-bit rotation unit 59, 7-bit rotation unit 60, 1-bit rotation unit 61, and 5-bit rotation unit 62 each perform a shift-rotating operation as a rotation operation. For example, the 3-bit rotation unit 55 performs 3-bit shift-rotating on input data. If the input data is the binary number 00110000, the result of performing 3-bit shift-rotating on the input data is 10000001.

A1 received by the first scramble unit 44 is supplied to the 3-bit rotation unit 55, the 5-bit rotation unit 56, and the exclusive OR unit 63. Thus, the bits of A1 are duplicated in that A1 is provided as an input to the respective rotation units 55 and 56, and to the exclusive OR unit 63. This input of a data block to a plurality of processing units is hereinafter referred to as branching.

The 3-bit rotation unit 55 performs a 3-bit shift-rotating operation on A1 to obtain Rot(A1,3), and outputs Rot(A1,3) to the exclusive OR unit 63.

Here, the expression "Rot(X,Y)" indicates a value obtained by performing Y-bit shift-rotating on X. The 5-bit rotation unit 56 performs a 5-bit shift-rotating operation on A1 to obtain Rot(A1,5), and outputs Rot(A1,5) to the exclusive OR unit 63. The exclusive OR unit 63 performs an exclusive OR operation on A1, Rot(A1,3), and Rot(A1,5) to obtain D1 (=A1(+)Rot(A1,3)(+)Rot(A1,5)), and outputs D1 to the second combining unit 45.

C1 is supplied to the 2-bit rotation unit 57, the 6-bit rotation unit 58, and the exclusive OR unit 64. Thus, the bits of C1 are duplicated in that C1 is provided as an input to the respective rotation units 57 and 58, and the exclusive OR unit 64. The 2-bit rotation unit 57 performs a 2-bit shift-rotating operation on A1 to obtain Rot(C1,2), and outputs Rot(C1,2) to the exclusive OR unit 64. The 6-bit rotation unit 58 performs a 6-bit shift-rotating operation on C1 to obtain Rot(C1,6), and outputs Rot(C1,6) to the exclusive OR unit 64. The exclusive OR unit 64 performs an exclusive OR operation on C1, Rot(C1,2), and Rot(C1,6) to obtain E1 (=C1(+)Rot(C1,2)(+)Rot(C1,6)), and outputs E1 to the second combining unit 45.

A2 is supplied to the 4-bit rotation unit 59, the 7-bit rotation unit 60, and the exclusive OR unit 65. Thus, the bits of A2 are duplicated in that A2 is provided as an input to the respective rotation units 59 and 60, and the exclusive OR unit 65. The 4-bit rotation unit 59 performs a 4-bit shift-rotating operation on A2 to obtain Rot(A2,4), and outputs Rot(A2,4) to the exclusive OR unit 65. The 7-bit rotation unit 60 performs a 7-bit shift-rotating operation on A2 to obtain Rot(A2, 7), and outputs Rot(A2,7) to the exclusive OR unit 65. The exclusive OR unit 65 performs an exclusive OR operation on A2, Rot(A2,4), and Rot(A2,7) to obtain D2 (=A2(+)Rot(A2,4)(+)Rot(A2,7)), and outputs D2 to the second combining unit 45.

C2 is supplied to the 1-bit rotation unit 61, the 5-bit rotation unit 62, and the exclusive OR unit 66. Thus, the bits of C2 are duplicated so that C2 is provided as an input to the respective rotation units 61 and 62, and the exclusive OR unit 66. The 1-bit rotation unit 61 performs a 1-bit shift-rotating operation on C2 to obtain Rot(C2,1), and outputs Rot(C2,1) to the exclusive OR unit 66. The 5-bit rotation unit 62 performs a 5-bit shift-rotating operation on C2 to obtain Rot(C2,5), and outputs Rot(C2,5) to the exclusive OR unit 66. The exclusive OR unit 66 performs an exclusive OR operation on C2, Rot(C2,1), and Rot(C2,5) to obtain E2 (=C2(+)Rot(C2,1)(+)Rot(C2,5)), and outputs E2 to the second combining unit 45.

Hereinafter, the data block group composed of D1 and D2, which are the results of the scramble processing performed on the first data block group (A1 and A2), is called the fourth data block group. Also, the data block group composed of E1 and E2, which are the results of the scramble processing performed on the third data block group (C1 and C2), is called the fifth data block group.

Figure 7:
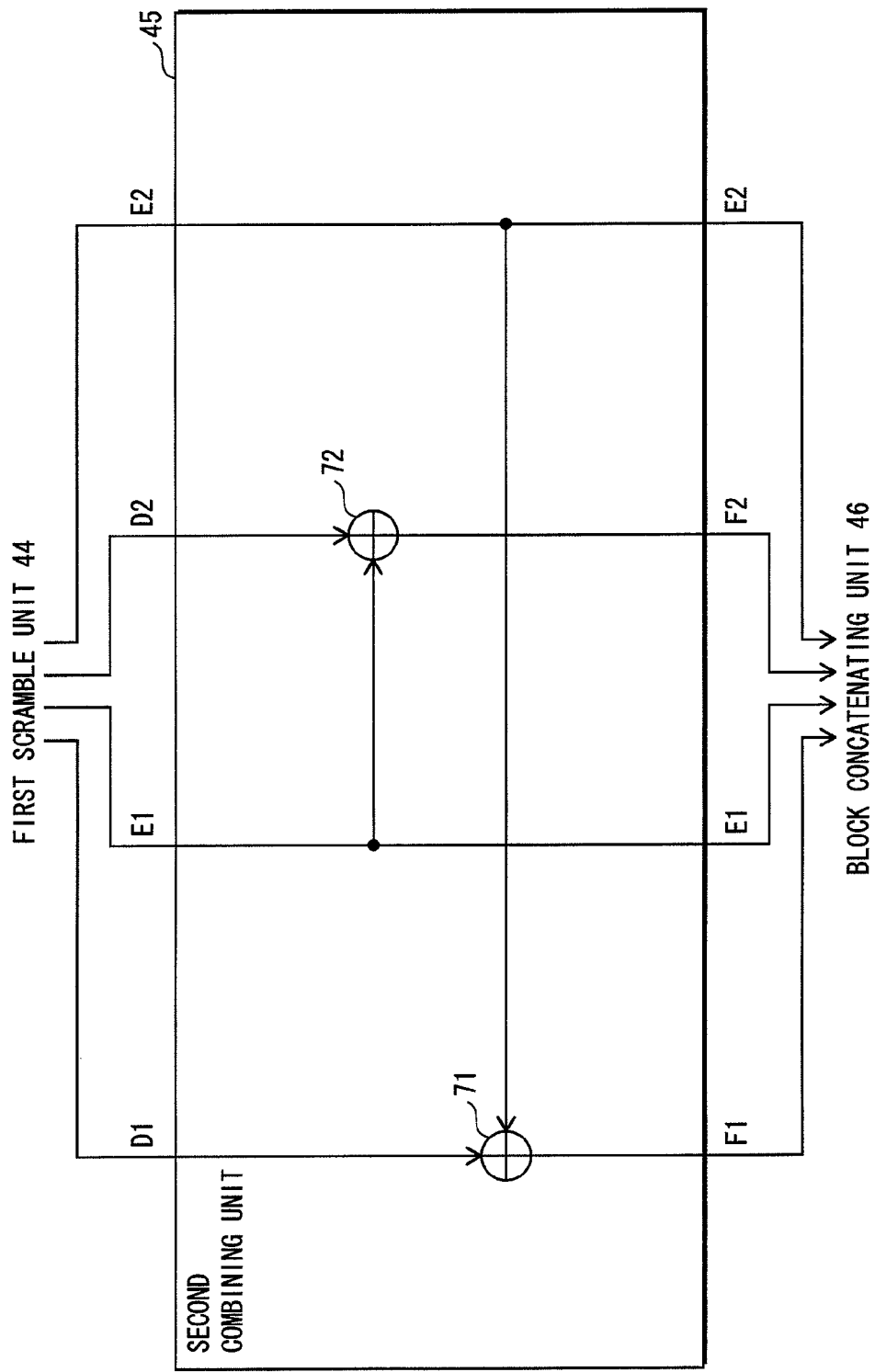
FIG. 7 shows the structure of a second combining unit pertaining to the embodiment of the present invention.
Figure 8:
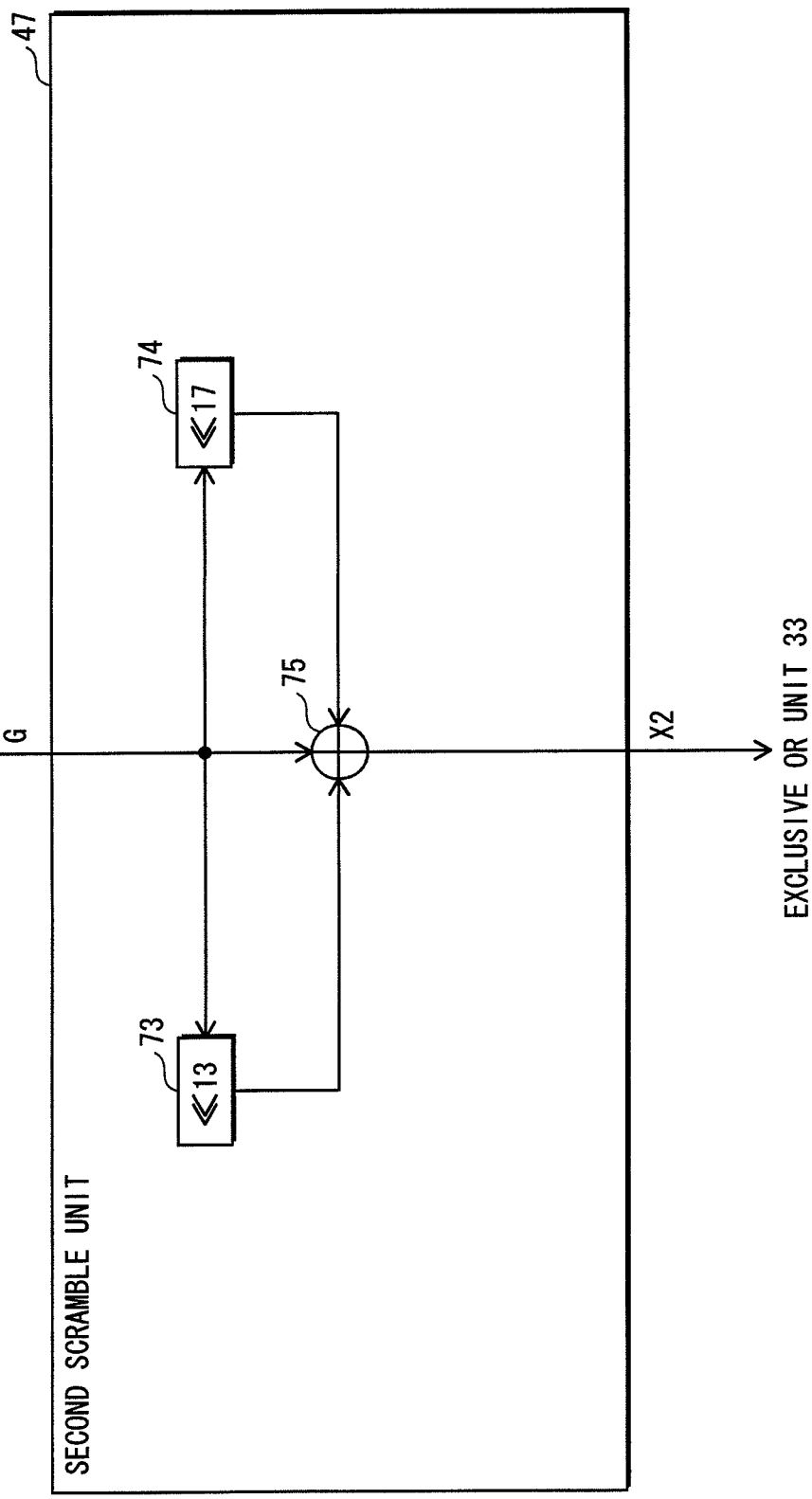
FIG. 8 shows the structure of a second scramble unit pertaining to the embodiment of the present invention.

As shown in FIG. 7, the second combining unit 45 includes exclusive OR units 71 and 72. The second combining unit 45 receives D1, E1, D2, and E2 from the first scramble unit 44. The second combining unit 45 branches E1 and E2, and outputs one of the branched E1 and one of the branched E2 unchanged to the block concatenating unit 46.

The exclusive OR unit 71 performs an exclusive OR operation on D1 with the other branched E2 to obtain F1 (=D1(+)E2), and outputs F1 to the block concatenating unit 46.

The exclusive OR unit 72 performs an exclusive OR operation on D2 with the other branched E1 to obtain F2 (=D2(+)E1), and outputs F2 to the block concatenating unit 46. To that end, the bits of E1 and E2 are duplicated in that E1 and E2 are provided as an input to the block concatenating unit 46 and, respectively, as inputs to the exclusive OR unit 71 and the exclusive OR unit 72.

Hereinafter, the data block group composed of F1 and F2, which are the results of the exclusive OR operations, is called the sixth data block group.

Here, the combination of blocks to be combined is different between the first combining unit 43 and the second combining unit 45. Specifically, beginning on the left, the first combining unit 43 combines the first block (A1) and the second block (B1), and combines the third block (A2) and the fourth block (B2). In contrast, beginning on the left, the second combining unit 45 combines the first block (D1) and the fourth block (E2), and combines the second block (E1) and the third block (D2).

Combining in the above manner is performed so that if, for example, a plurality of data pieces that have only one differing bit are provided, the 1-bit difference has a wider range of influence on the output data.

The block concatenating unit 46 receives, from the second combining unit 45, E1 and E2 that are included in the fifth data block group and F1 and F2 that are included in the sixth data block group, thereafter concatenates F1, F2, E1 and E2 to obtain a 32-bit value G, and outputs the 32-bit value G to the second scramble unit 47. Here, E2 becomes the 1st bit to 8th bit of G, F2 becomes the 9th bit to 16th bit of G, E1 becomes the 17th bit to 24th bit of G, and F1 becomes the 25th bit to 32nd bit of G.

The second scramble unit 47 includes a 13-bit rotation unit 73, a 17-bit rotation unit 74, and an exclusive OR unit 75. The second scramble unit 47 receives G from the block concatenating unit 46.

The second scramble unit 47 then supplies G to the 13-bit rotation unit 73, the 17-bit rotation unit 74, and the exclusive OR unit 75.

The 13-bit rotation unit 73 performs a 13-bit shift-rotating operation on G to obtain Rot(G,13), and outputs Rot(G,13) to the exclusive OR unit 75. The 17-bit rotation unit 74 performs a 17-bit shift-rotating operation on G to obtain Rot(G,17), and outputs Rot(G,17) to the exclusive OR unit 75. The exclusive OR unit 75 performs an exclusive OR operation on G, Rot(G, 13), and Rot(G,17) to obtain X2 (=G(+)Rot(G,13)(+)Rot(G, 17)), and outputs X2 to the exclusive OR unit 33.

1.2. Structure of the Decryption Apparatus 3

The following describes the decryption apparatus 3.

As shown in FIG. 1, the decryption apparatus 3 includes an output unit 15, a decryption unit 16, a decryption key holding unit 17, and a reception unit 18.

1.2.1. Output Unit 15, Decryption Key Holding Unit 17, Reception Unit 18

The output unit 15 acquires the decrypted data DT from the decryption unit 16, and outputs the decrypted data DT to an external device. For example, the output unit 15 is connected to a display, and causes the display to display the decrypted data DT.

The decryption key holding unit 17 holds a 256-bit decryption key DK. The value of the decryption key DK is the same as the value of the encryption key CK held by the encryption key holding unit 13 of the encryption apparatus 2.

The reception unit 18 receives the encrypted data CT from the transmission unit 14 of the encryption apparatus 2 via the communication channel 4, and outputs the received encrypted data CT to the decryption unit 16.

1.2.2. Decryption Unit 16

Figure 9:
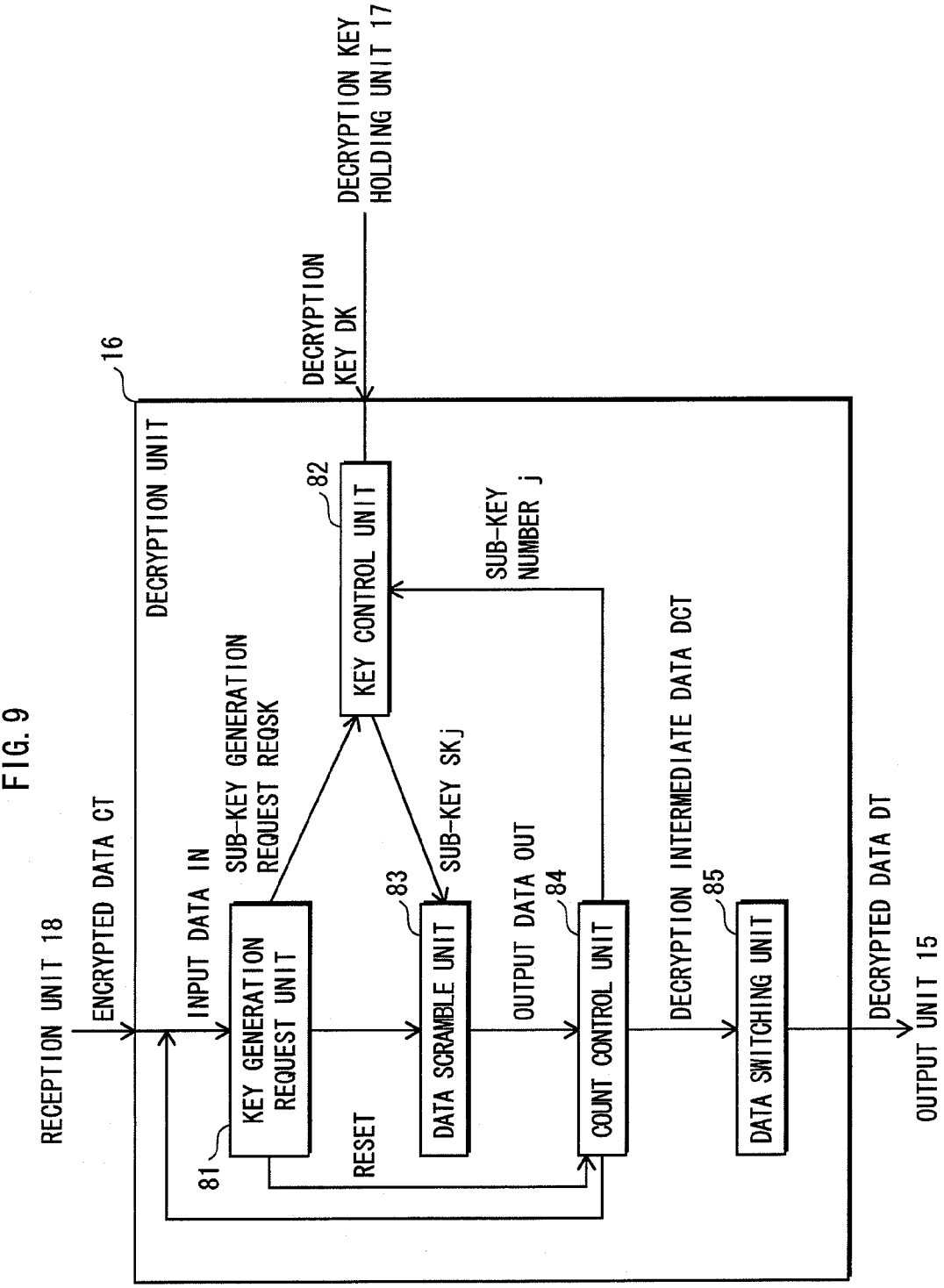
FIG. 9 shows the structure of a decryption unit pertaining to the embodiment of the present invention.

As shown in FIG. 9, the decryption unit 16 includes a key generation request unit 81, a key control unit 82, a data scramble unit 83, and a count control unit 84. The decryption unit 16 is specifically a dedicated microcomputer etc. that includes a plurality of function units. The function units are realized by programs stored in the microcomputer. Alternatively, each function unit may be an independent microcomputer.

The key generation request unit 81 receives an input of the encrypted data CT from the reception unit 18, and thereafter outputs a sub-key generation request REQSK to the key control unit 82, outputs a reset signal to the count control unit 84, and outputs the encrypted data CT as input data IN to the data scramble unit 83.

Upon receiving input data IN from the count control unit 84, the key generation request unit 81 outputs the received input data IN to the data scramble unit 83.

The key control unit 82 receives the sub-key generation request REQSK from the key generation request unit 81, and thereafter acquires the 256-bit decryption key DK from the decryption key holding unit 17 and splits the decryption key DK into sub-keys SK1 to SK8 that are each 32 bits long. More specifically, the values of the 1st bit to 32nd bit of the decryption key DK become the sub-key SK1, the values of the 33rd bit to the 64th bit of the decryption key DK become the sub-key SK2, and so on until the values of the 225th bit to the 256th bit of the decryption key DK become the sub-key SK8.

The key control unit 82 receives a sub-key number whose value is j (where j is a natural number from 1 to 8 inclusive) from the count control unit 84, and thereafter outputs, to the data scramble unit 83, the sub-key SKj that corresponds to the received sub-key number. For example, if the sub-key number is 1, the key control unit 82 outputs the sub-key SK1 to the data scramble unit 83.

When the data scramble unit 83 has acquired the 64-bit input data IN from the key generation request unit 81, and furthermore has acquired the 32-bit sub-key data SKj from the key control unit 82, the data scramble unit 83 performs scramble processing with use of the sub-key data SKj and the input data IN to obtain 64-bit output data OUT, and outputs the 64-bit output data OUT to the count control unit 84. A description of the structure of the data scramble unit 83 has been omitted due to being the same as the data scramble unit 23.

The count control unit 84 counts the number of times that scramble processing has been performed by the data scramble unit 83, and performs control such that the scramble processing is executed a number of times equal to a predetermined scramble count. In the present embodiment, the predetermined scramble count is 8.

Upon receiving the reset signal from the key generation request unit 81, the count control unit 84 resets the count value to 0, and transmits (8−count value) as the sub-key number to the key control unit 82. In, this case, the sub-key number that is transmitted to the key control unit 82 is 8.

Upon receiving the output data OUT from the data scramble unit 83, the count control unit 84 increments the count value by one, and if the incremented count value is less than the predetermined scramble count, outputs (8−count value) as the sub-key number to the key control unit 82. In other words, the count control unit 84 outputs sub-keys in an order that is opposite to the case of encryption in the encryption apparatus 2. The count control unit 84 also outputs the received output data OUT as input data IN to the key generation request unit 81.

If the incremented count value is equal to the predetermined scramble count, the count control unit 84 refrains from transmitting a sub-key number to the key control unit 82, and outputs the output data OUT, that was received from the data scramble unit 83, to a data switching unit 85 as decryption intermediate data DCT. The decryption intermediate data DCT is 64-bit data.

The data switching unit 85 acquires the 64-bit decryption intermediate data DCT, and thereafter switches the values of the least significant 32 bits of the decryption intermediate data DCT and the values of the most significant 32 bits thereof to obtain the decrypted data DT, and outputs the decrypted data DT to the output unit 15.

2. Data Processing 2.1. Encryption Processing

The following describes encryption processing performed on input data IN by the encryption apparatus 2 having the above-described structure, with reference to the drawings.

Figure 10:
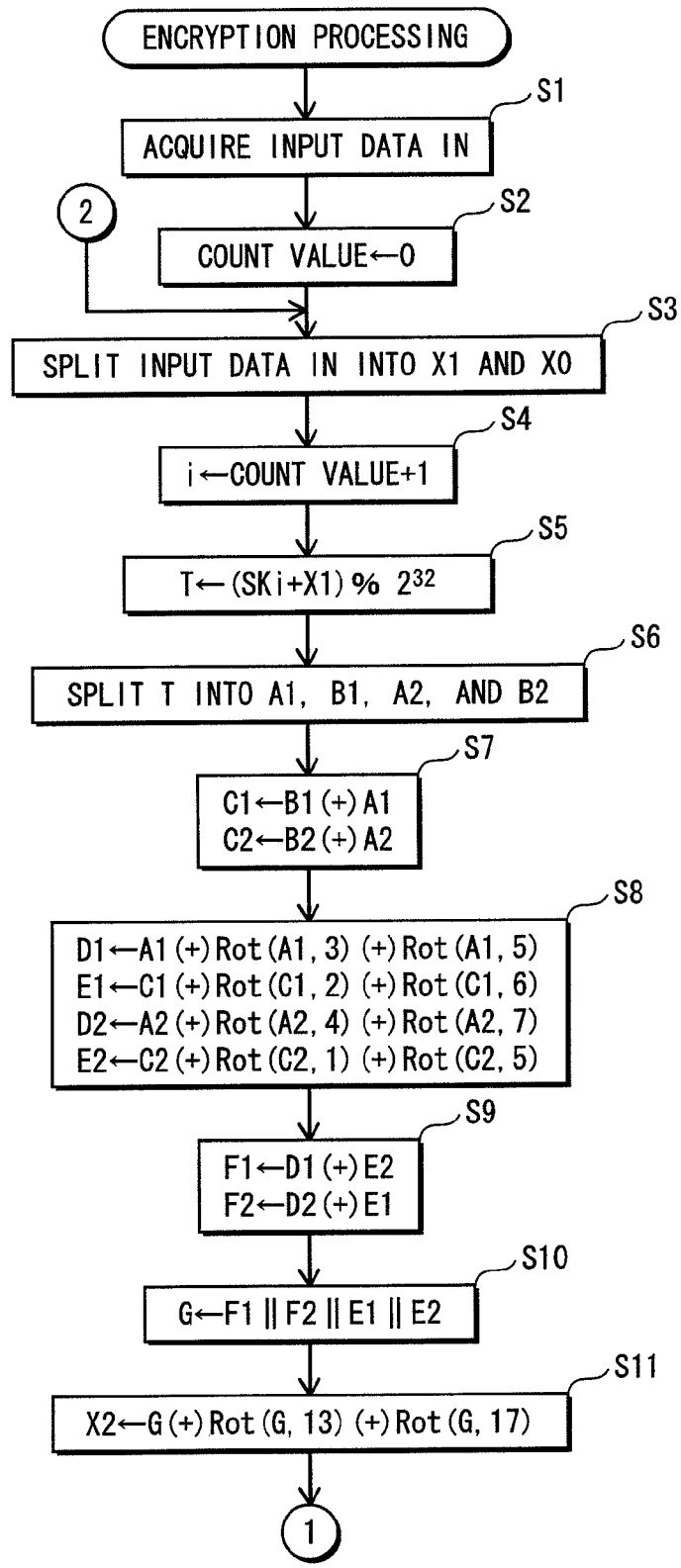
FIG. 10 is a flowchart showing a part of encryption processing.
Figure 11:
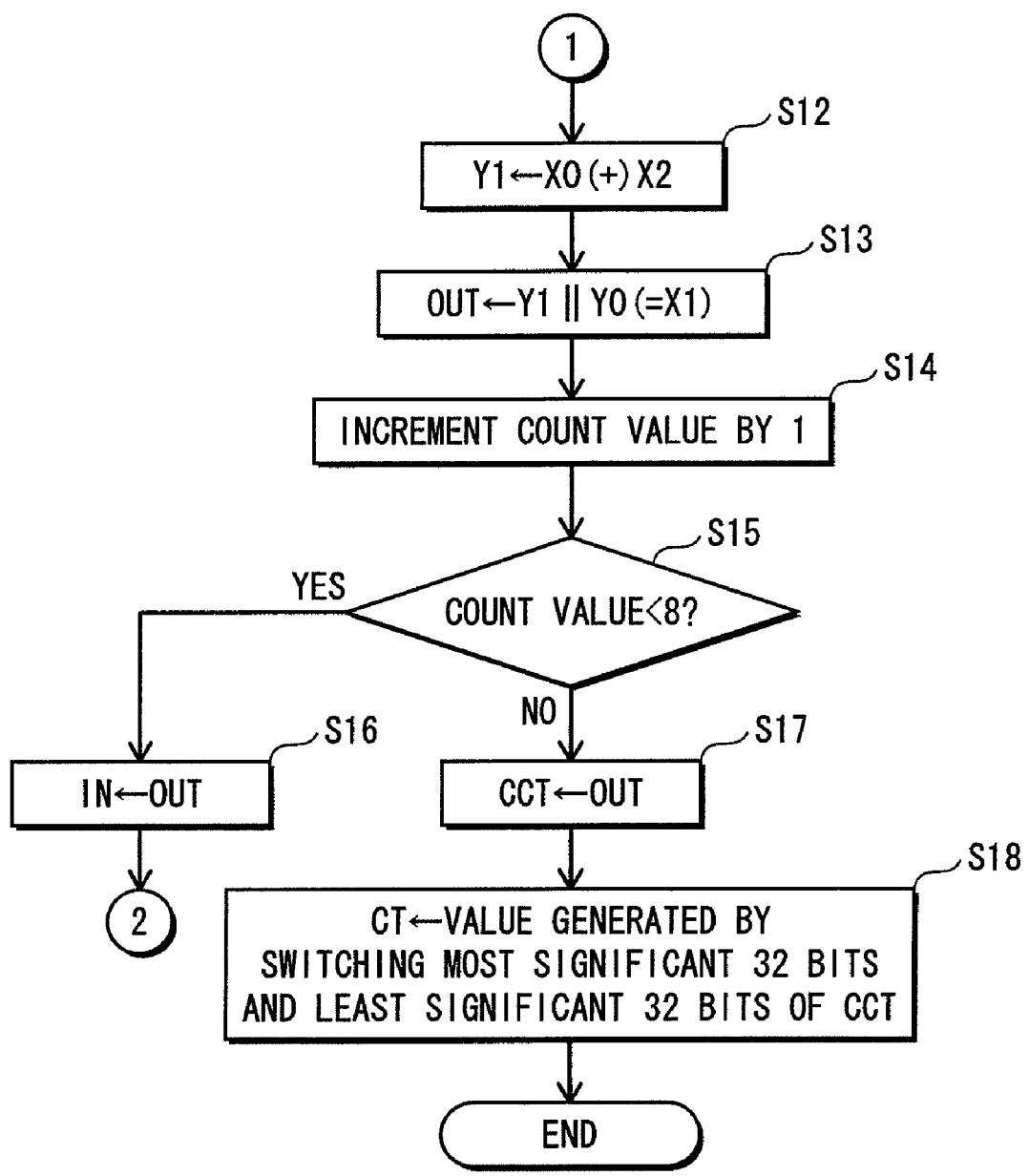
FIG. 11 is a flowchart showing another part encryption processing.
Figure 12:
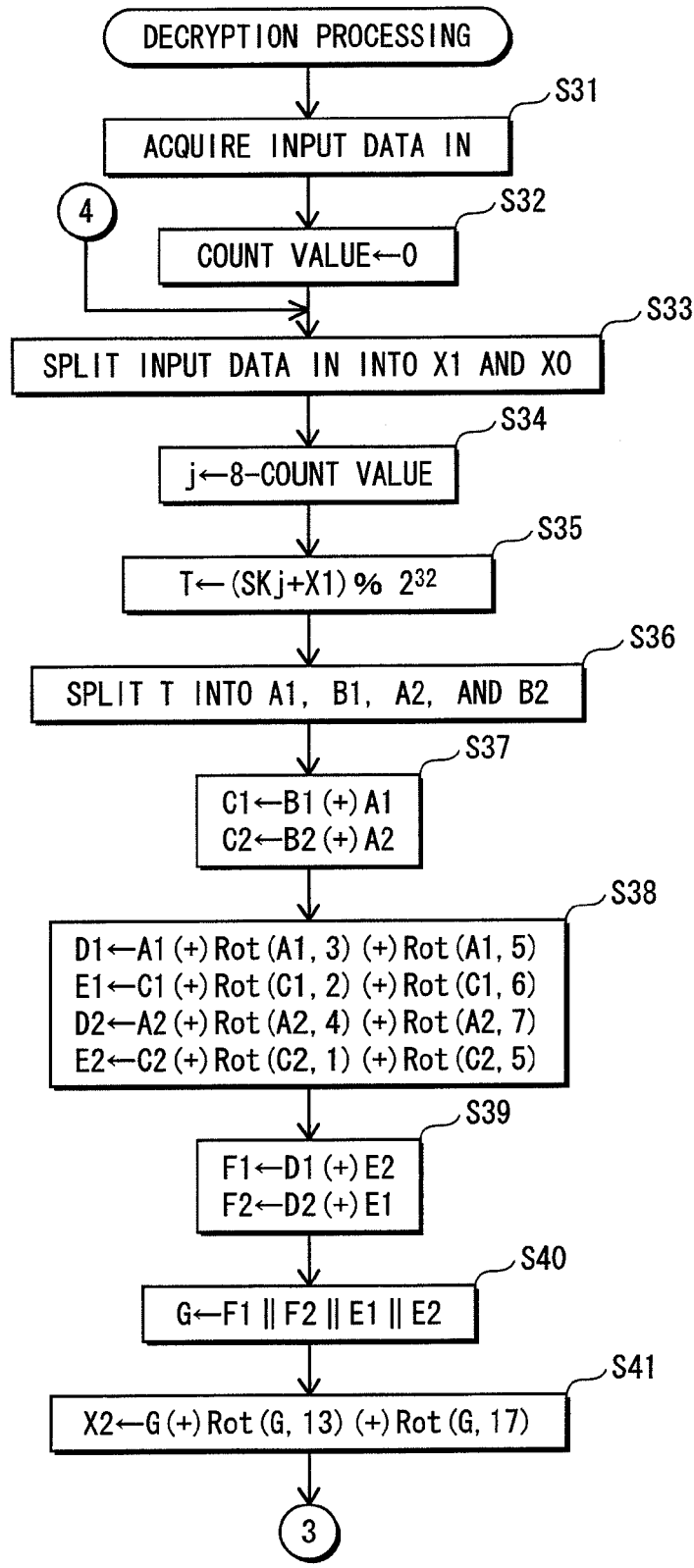
FIG. 12 is a flowchart showing a part of decryption processing.
Figure 13:
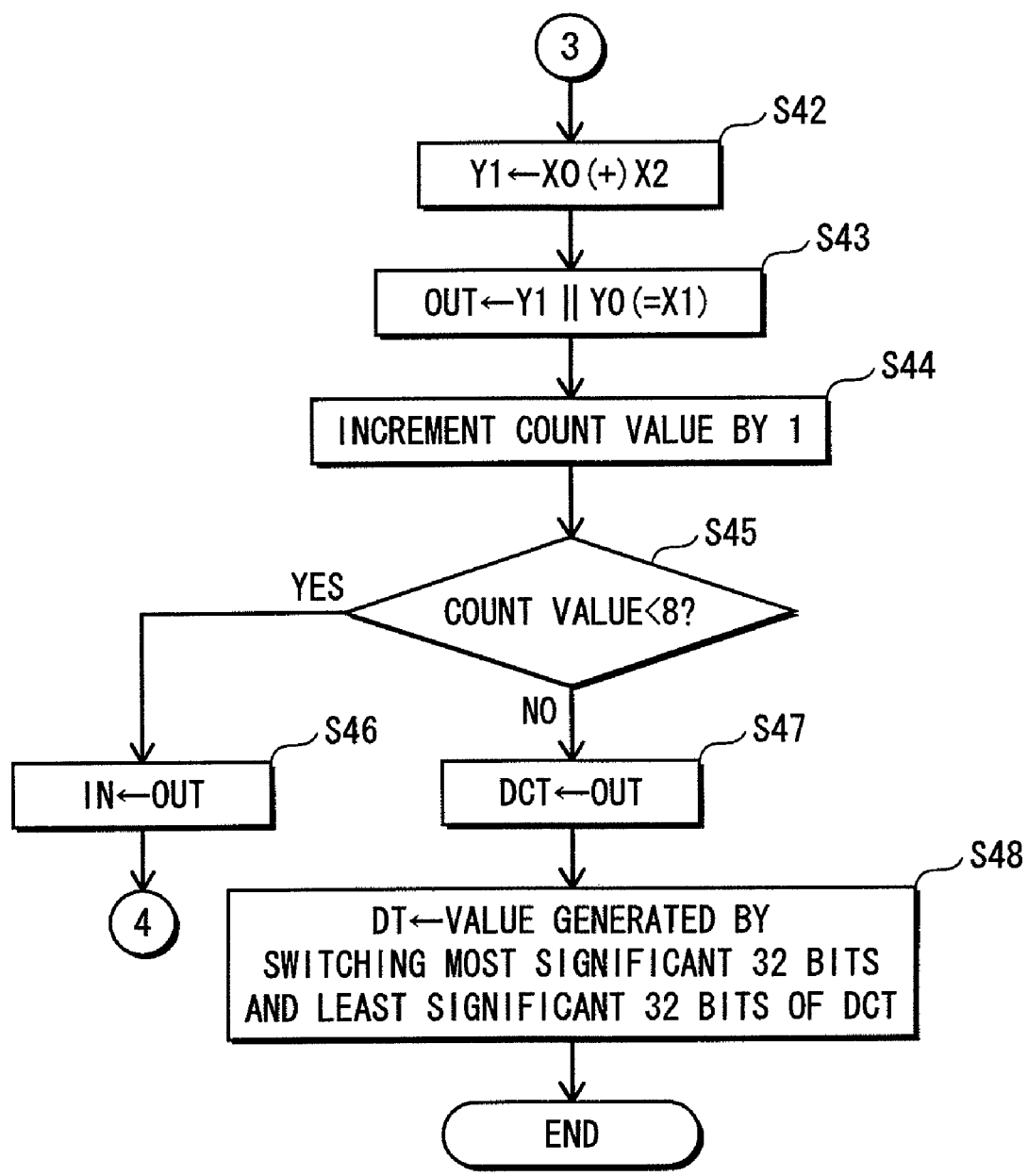
FIG. 13 is a flowchart showing another part of decryption processing.

FIGS. 10 and 11 show the encryption processing that is performed by the encryption apparatus 2.

In the encryption apparatus 2, firstly PT is acquired as IN (step S1).

Next, the count value, which is an internal variable, is reset to 0 (step S2).

IN is split into the value X1, which is the most significant 32 bits of IN, and the value X0, which is the least significant 32 bits of IN (step S3).

Then, T is generated with use of the sub-key SKi and X1 (step S5).

$$T \leftarrow (SKi + X1) \% \ 2^{32}$$

Here, i is the count value+1 (step S4). Also, the mark "←" indicates substitution, and the characters "X % Y" indicate a remainder, that is to say, the remainder of dividing X by Y.

T is a 32-bit value, and is split into four 8-bit pieces beginning from the most significant bits (step S6). The split four 8-bit data pieces are A1, B1, A2, and B2.

Next, C1 and C2 are generated using A1, B1, A2, and B2 (step S7).

$$C1 \leftarrow B1(+)A1$$

$$C2 \leftarrow B2(+)A2$$

Next, D1, E1, D2, and E2 are generated using A1, C1, A2, and C2 (step S8).

$$D1 \leftarrow A1(+)\mathrm{Rot}(A1,3)(+)\mathrm{Rot}(A1,5)$$

$$E1 \leftarrow C1(+)\mathrm{Rot}(C1,2)(+)\mathrm{Rot}(C1,6)$$

$$D2 \leftarrow A2(+)\mathrm{Rot}(A2,4)(+)\mathrm{Rot}(A2,7)$$

$$E2 \leftarrow C2(+)\mathrm{Rot}(C2,1)(+)\mathrm{Rot}(C2,5)$$

Next, F1 and F2 are generated using D1, E1, D2, and E2 (step S9).

$$F1 \leftarrow D1(+)E2$$

$$F2 \leftarrow D2(+)E1$$

Then, G is generated by concatenating F1, F2, E1, and E2 (step S10).

$$G \leftarrow F1\|F2\|E1\|E2$$

Here, the mark "||" indicates bit concatenation.
Then, X2 is generated using G (step S11).

$$X2 \leftarrow G(+)\mathrm{Rot}(G,13)(+)\mathrm{Rot}(G,17)$$

Next, Y1 is generated using X0 and X2 (step S12).

$$Y1 \leftarrow X0(+)X2$$

Next, OUT is generated using Y0 and Y1 (step S13).

$$\mathrm{OUT} \leftarrow Y1\|Y0$$

Here, Y0 has the same value as X1.
Next, the count value is incremented by 1 (step S14), and if the incremented count value is less than 8 (step S15:YES), the output data OUT generated in step S13 is set as the input data IN (step S16), and the processing of step S3 onward is performed using the input data IN of step S16 as the processing target.

If the incremented count value is 8 or more (step S15:NO), the output data OUT generated in step S13 is set as the intermediate data CCT (step S17), and the encrypted data CT is generated by switching the most significant 32 bits of the intermediate data CCT and the least significant 32 bits thereof (step S18).

2.2. Decryption Processing

The following describes decryption processing performed by the decryption apparatus 3 having the above-described structure on CT generated by the above-described encryption processing, with reference to the drawings.

In the decryption apparatus 3, firstly CT is acquired as IN (step S31).

Next, the count value, which is an internal variable, is reset to 0 (step S32).

IN is split into the value X1, which is the most significant 32 bits of IN, and the value X0, which is the least significant 32 bits of IN (step S33).

Then, T is generated with use of the sub-key SKj and X1 (step S35).

$$T \leftarrow (SKj+X1)\%\,^{\wedge}32$$

Here, j is 8–the count value (step S34).

T is a 32-bit value, and is split into four 8-bit pieces beginning from the most significant bits (step S36). The split four 8-bit data pieces are A1, B1, A2, and B2.

Next, C1 and C2 are generated using A1, B1, A2, and B2 (step S37).

$$C1 \leftarrow B1(+)A1$$

$$C2 \leftarrow B2(+)A2$$

Next, D1, E1, D2, and E2 are generated using A1, C1, A2, and C2 (step S38).

$$D1 \leftarrow A1(+)\mathrm{Rot}(A1,3)(+)\mathrm{Rot}(A1,5)$$

$$E1 \leftarrow C1(+)\mathrm{Rot}(C1,2)(+)\mathrm{Rot}(C1,6)$$

$$D2 \leftarrow A2(+)\mathrm{Rot}(A2,4)(+)\mathrm{Rot}(A2,7)$$

$$E2 \leftarrow C2(+)\mathrm{Rot}(C2,1)(+)\mathrm{Rot}(C2,5)$$

Next, F1 and F2 are generated using D1, E1, D2, and E2 (step S39).

$$F1 \leftarrow D1(+)E2$$

$$F2 \leftarrow D2(+)E1$$

Then, G is generated by concatenating F1, F2, E1, and E2 (step S40).

$$G \leftarrow F1\|F2\|E1\|E2$$

Here, the mark "||" indicates bit concatenation.
Then, X2 is generated using G (step S41).

$$X2 \leftarrow G(+)\mathrm{Rot}(G,13)(+)\mathrm{Rot}(G,17)$$

Next, Y1 is generated using X0 and X2 (step S42).

$$Y1 \leftarrow X0(+)X2$$

Next, OUT is generated using Y0 and Y1 (step S43).

$$\mathrm{OUT} \leftarrow Y1\|Y0$$

Here, Y0 has the same value as X1 if the decryption is successful.

Next, the count value is incremented by one (steps S44), and if the incremented count value is less than 8 (step S45: YES), the output data OUT generated in step S43 is set as the encrypted data CT (step S46), and the processing of step S33 onward is performed using the encrypted data CT of step S46 as the processing target.

If the incremented count value is 8 or more (step S45:NO), the output data OUT generated in step S33 is set as the decryption intermediate data DCT (step S47), and the decrypted data DT is generated by switching the most significant 32 bits of the decryption intermediate data DCT and the least significant 32 bits thereof (step S48).

3. Effects

The following describes the above-described present invention's effect of achieving high scrambling performance. An existing evaluation method is used to evaluate the degree to which the data obtained by the present invention is scrambled. In this evaluation method, output data obtained from a certain piece of input data is compared with output data obtained from input data that differs from the other input data by one bit, and how many bits are different between the two output data pieces is used as an indicator. The greater the number of bits that differ between the output data pieces, the higher the degree of scrambling.

Here, two pieces of input data that have one differing bit are input to the addition unit 41 of the data converting unit 32. The two input data pieces are then subjected to the processing of the block split unit 42, the first combining unit 43, the first scramble unit 44, the second combining unit 45, and the block concatenating unit 46. The two pieces of output data from the block concatenating unit 46 that correspond to the two pieces of input data are then compared in order to evaluate the degree of scrambling.

Since the evaluation results differ depending on the position of the bit that differs between the two input data pieces, the following describes four separate cases of the scrambling performance evaluation.

3.1. One Bit from the 1st Bit to the 8th Bit Differs Between Two Input Data Pieces In the following case, one bit from the 1st bit to the 8th bit differs between two 32-bit input data pieces, and the remaining 31 bits are all the same.

Specifically, the one bit that differs between the two input data pieces is assumed to be included in B2 which is generated by the splitting performed by the block split unit 42.

Firstly, the two input data pieces are separately input to the block split unit 42. As stated above, among the results of the splitting of the input data pieces by the block split unit 42, one bit differs between the B2 data blocks, and the remaining A1, B1, and A2 data blocks are the same between the two input data pieces.

The first combining unit 43 then combines A2 and B2. However since A2 is the same between the two input data pieces, there is no increase or decrease in the number of bits that differ between the results of this combining. Consequently, among the data output from the first combining unit 43, one bit differs between the C2 data blocks, and the remaining A1, C1, and A2 data blocks are the same between the two input data pieces.

Next, the first scramble unit 44 performs scramble processing on the output of the first combining unit 43.

The scramble processing performed by the first scramble unit 44 is structured such that if one bit differs between two input data pieces, three bits will be different between the two output data pieces. This is because, for each input data piece, the portion that differs by one bit is shift-rotated (rotated) by different shift amounts (rotation amounts), and the shifted values are combined together.

As a result, three bits differ between the output E2 data blocks of the first scramble unit 44 that correspond to the input C2 data blocks. The remaining D1, E1, and D2 data blocks are the same since the data subjected to the scramble processing is the same between the two input data pieces.

Next, the second combining unit 45 combines E2 and D1. Since three bits differ between the E2 data blocks, and since D1 is the same between the two input data pieces, three bits will always be different between the output F1 data blocks generated by this combining. The remaining E1 and F2 data blocks are the same between the two input data pieces.

Lastly, the block concatenating unit 46 concatenates F1, E1, F2, and E2. Since three bits differ between the F1 data blocks and three bits differ between the E2 data blocks, six bits will be different between the concatenated values (i.e., the output).

3.2. One Bit from the 9th Bit to the 16th Bit Differs Between Two Input Data Pieces In the following case, one bit from the 9th bit to the 16th bit differs between two 32-bit input data pieces, and the remaining 31 bits are all the same.

Specifically, the one bit that differs between the two input data pieces is assumed to be included in A2 which is generated by the splitting performed by the block split unit 42.

Firstly, the two input data pieces are separately input to the block split unit 42. As stated above, among the results of the splitting of the input data pieces by the block split unit 42, one bit differs between the A2 data blocks, and the remaining A1, B1, and B2 data blocks are the same.

The first combining unit 43 then combines the A2 that have one differing bit with the respective B2 data blocks that are the same as each other. Consequently, among the data output from the first combining unit 43, one bit differs between the A2 data blocks and one bit differs between the C2 data blocks. The remaining A1 and C1 data blocks are the same between the two input data pieces. Next, the first scramble unit 44 performs scramble processing on the output of the first combining unit 43. Three bits differ between the output D2 data blocks of the first scramble unit 44 that correspond to the input A2, and three bits differ between the output E2 data blocks of the first scramble unit 44 that correspond to the input C2 data blocks. The remaining D1 and E1 data blocks are the same since the data subjected to the scramble processing is the same between the two input data pieces.

Next, the second combining unit 45 combines E2 and D1. Since three bits differ between the E2 data blocks, and since D1 is the same between the two input data pieces, three bits will always be different between the output F1 data blocks generated by this combining. Consequently, among the output of the second combining unit 45, three bits differ between the F1 data blocks, three bits differ between the F2 data blocks, and three bits differ between the E2 data blocks.

Lastly, the block concatenating unit 46 concatenates F1, E1, F2, and E2. Since three bits differ between the F1 data blocks, three bits differ between the F2 data blocks, and three bits differ between the E2 data blocks, at least nine bits will be different between the concatenated values (i.e., the output).

3.3. One Bit from the 17th Bit to the 24th Bit Differs Between Two Input Data Pieces In the following case, one bit from the 17th bit to the 24th bit differs between two 32-bit input data pieces, and the remaining 31 bits are all the same. Specifically, the one bit that differs between the two input data pieces is assumed to be included in B1 which is generated by the splitting performed by the block split unit 42.

Firstly, the two input data pieces are separately input to the block split unit 42. As stated above, among the results of the splitting of the input data pieces by the block split unit 42, one bit differs between the B1 data blocks, and the remaining A1, A2, and B2 data blocks are the same.

The first combining unit 43 then combines A1 and B1. However, since A1 is the same between the two input data pieces, there is no increase or decrease in the number of bits that differ between the results of this combining. Consequently, among the data output from the first combining unit 43, one bit differs between the C1 data blocks, and the remaining A1, A2 and C2 data blocks are the same between the two input data pieces. Next, the first scramble unit 44 performs scramble processing on the output of the first combining unit 43. Three bits differ between the output E1 data blocks of the first scramble unit 44 that correspond to the input C1 data blocks. The remaining D1, D2, and E2 data blocks are the same since the data subjected to the scramble processing is the same between the two input data pieces.

Next, the second combining unit 45 combines E1 and D2. Since three bits differ between the E1 data blocks, and since D2 is the same between the two input data pieces, three bits will always be different between the output F2 data blocks generated by this combining.

Lastly, the block concatenating unit 46 concatenates F1, E1, F2, and E2. Since three bits differ between the E1 data blocks and three bits differ between the F2 data blocks, at least six bits will be different between the concatenated values (i.e., the output).

3.4. One Bit from the 25th Bit to the 32nd Bit Differs Between Two Input Data Pieces In the following case, one bit from the 25th bit to the 32nd bit differs between two 32-bit input data pieces, and the remaining 31 bits are all the same. Specifically, the one bit that differs between the two input data pieces is assumed to be included in A1 which is generated by the splitting performed by the block split unit 42.

Firstly, the two input data pieces are separately input to the block split unit 42. As stated above, among the results of the splitting of the input data pieces by the block split unit 42, one bit differs between the A1 data blocks, and the remaining B1, A2, and B2 data blocks are the same.

The first combining unit 43 then combines the A1 that have one differing bit to the respective B1 data blocks that are the same as each other. Consequently, among the data output from the first combining unit 43, one bit differs between the A1 data blocks and one bit differs between the C1 data blocks.

The remaining A2 and C2 data blocks are the same between the two input data pieces. Next, the first scramble unit 44 performs scramble processing on A1 and C1.

Three bits differ between the output D1 data blocks of the first scramble unit 44 that correspond to the input A1 data blocks, and three bits differ between the output E1 data blocks of the first scramble unit 44 that correspond to the input C1 data blocks. The remaining D2 and E2 data blocks are the same since the data subjected to the scramble processing is the same between the two input data pieces.

Next, the second combining unit 45 combines E1 and D2. Since three bits differ between the E1 data blocks, and since D2 is the same between the two input data pieces, three bits will always be different between the output F2 data blocks generated by this combining.

Lastly, the block concatenating unit 46 concatenates F1, E1, F2, and E2. Since three bits differ between the F1 data blocks, three bits differ between the E1 data blocks, and three bits differ between the F2 data blocks, at least nine bits will be different between the concatenated values (i.e., the output).

3.5. Summary

As described above, when one bit differs between two data pieces that are input to the data converting unit 32, at least six bits will be different between the two corresponding pieces of output from the block concatenating unit 46, thereby realizing high scrambling performance.

The structure of the data converting unit 32 does not include substitution processing (conversion processing using a table). Instead, the data converting unit 32 is constituted entirely from splitting means, exclusive OR operations, and shift-rotating (rotation). This structure enables realizing hardware that is more compact than a case of including substitution processing (conversion processing using a table). This in turn enables reducing the hardware scale during hardware implementation, while realizing high scrambling performance.

Also, the first scramble unit 32 in the data converting unit 32 performs scramble processing on all of the split data blocks.

According to this structure, when two input data pieces that have one differing bit are supplied, performing scramble processing on all of the data blocks ensures that the one-bit difference is magnified, regardless of which bit is different.

Also, the data converting unit 32 is structured such that the first scramble unit 44 and second scramble unit 47 perform scramble processing according to different bit units. More specifically, the first scramble unit 44 performs scramble processing in 8-bit units (the unit of the results of the splitting performed by the block split unit 42), and the second scramble unit 47 performs scramble processing in 32-bit units (the unit of the entire input data piece).

Since the conversion used in the scramble processing of the present embodiment is linear processing, if the scramble processing were repeated according to the same bit unit, there would be cases in which the difference would be negated, and the scrambling effect would not be improved. However, performing conversion in different bit units as in the present embodiment minimizes the negation of the difference and realizes an overall high degree of scrambling performance.

Also, the first scramble unit 44 and second scramble unit 47 branch input data into three pieces, perform three types of rotation (including 0-bit rotation) thereon, and combine the results.

Such conversion processing is performed because it has been shown logically that the process of performing an odd number (i.e., 3 or more) rotations and then combining the results is bijective conversion. In the case of bijective conversion, the number of possible patterns of values after conversion is the same as the number of possible patterns of values before conversion, and therefore when conversion is performed on different values, the values of the conversion results will always be different. This property ensures that in a case of performing conversion on two data pieces that have one differing bit, the conversion results will always having one or more different bits (e.g., three bits will always be different in the present embodiment).

In the present embodiment, high scrambling performance is achieved by performing scramble processing that uses the above property, and furthermore magnifying the difference of one or more bits by performing combining processing etc.

As mentioned in the above description, the number of branches and number of types of rotation is not limited to three. An odd number greater than or equal to three is desirable, such as five or seven.

4. Supplementary Remarks

Although described based on the above embodiment, the present invention is not limited to the above embodiment. Various types of modifications can of course be made without departing from the scope of the present invention.

4.1. The structure described in the above embodiment is merely one example, and the present invention is not limited to this. For example, a different rotation amount may be used as the rotation number (shift amount). Also, the structure and order of the constituent elements may be different from as described above.

4.2. Although data is encrypted and decrypted in 64-bit units in the structure described in the above embodiment, the present invention is not limited to this. Encryption and decryption may be performed according to, for example, units of 32 bits or 128 bits.

4.3. Although a 256-bit encryption key and decryption key are used in the structure described in the above embodiment, the present invention is not limited to this. For example, processing may be performed to expand a 128-bit key into a 256-bit key, and the 256-bit key may be used.

4.4. Although substitution processing (conversion processing using a table) is not performed even a single time in the structure described in the above embodiment, the present invention is not limited to this. A number of substitution processes may be combined with the structure described in the above embodiment. For example, substitution processing may be used in place of one set of a rotation unit and a combining unit in the first scramble unit 44. Even this structure enables reducing the gate scale during hardware implementation over a case of performing substitution processing a large number of times.

4.5. Although the present invention is described in the above embodiment based on the assumption of being implemented by hardware, it goes without saying that the present invention can be implemented by software. The effects described above were in the case of implementation using hardware. However, the present invention eliminates the need to have a memory area for holding a substitution table even in the case of implementation using software, thereby obtaining the effect of enabling encryption and decryption processing that achieve a high degree of scrambling even with a device that has a very small memory capacity.

4.6. Although the addition unit 41 adds X1 and the sub-key SKi before the processing of the block split unit is performed in the above embodiment, the present invention is not limited to this. X1 and the sub-key SKi may be combined by a different operation. For example, this combining may be achieved by an exclusive OR operation.

4.7. In the first scramble unit 44, the combination of shift amounts used in the rotation performed on the blocks is different for each block. For example, whereas the shift amounts for A1 are 3 bits, 0 bits, and 5 bits, the shift amounts for C2 are 2 bits, 0 bits, and 6 bits, which is a different combination of shift amounts than for A1. In the same way, the combinations of shift amounts for A2 and C2 do not match the shift amounts for any other blocks.

Although this structure is employed in the above embodiment in order to increase scrambling performance, the present invention is not limited to this structure. For example, the combination of rotation shift amounts may be the same for a plurality of blocks. In this case, the first scramble unit 44 may have one set of rotation units, and this set of rotation units may be used for all of the blocks. This case enables a further reduction in circuit scale.

4.8. Although scramble processing is performed after splitting data into four blocks in the above embodiment, the present invention is not limited to this. Data may be split into, for example, five or more blocks, or three or fewer blocks.

4.9. In the first scramble unit 44 and the second scramble unit 47 described in the above embodiment, a rotation unit is not provided for one of the three pieces of data resulting from branching. This structure is employed in order to perform 0-bit shift-rotating.

However, the present invention is not limited to this. 1-bit or more shift-rotating may be performed on all three pieces of data resulting from branching. It should be noted that 0-bit shift-rotating can be realized by merely outputting a piece of branched data unchanged to the exclusive OR unit, and as such, 0-bit shift-rotating does not require the addition of a circuit. Using 0-bit shift-rotating is therefore beneficial to reducing the circuit scale.

Also, a piece of branched data is directly used when 0-bit shift-rotating is performed in the above embodiment. However, a dummy rotation unit that does not perform any processing may be provided in a case when the shift amount is "0".

4.10. The shift-rotating may be shifting that discards digit carrying. It should be noted that such a case cannot ensure bijectivity.

4.11. The devices of the above embodiment and modifications may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

4.12. A portion or all of the constituent elements of the devices of the above embodiment and modifications may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program. The constituent elements may each be made into a single and separate chip, or may be made into a single chip including a portion or all portions thereof.

The LSI referred to here is also called an IC, a system LSI, a super LSI, or an ultra LSI depending on the degree of integration.

Also, the integration is not limited to LSI implementation, but instead may be realized by a dedicated circuit. A field programmable gate array (FPGA) or a silicon flexible processor in which the connection and settings of circuit cells in the LSI can be restructured after LSI manufacture can also be used.

Furthermore, if integration technology is developed that replaces LSIs due to progressive or derivative semiconductor technology, integration of functional blocks using this technology is naturally possible. For example, the application of biotechnology is a possibility.

4.13. A portion or all of the constituent elements of the devices of the above embodiment and modifications may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

4.14. The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be carried out by another independent computer system by transferring the programs or the digital signals which have been recorded on the recording media, or by transferring the programs or the digital signals via the network, etc.

4.15. The present invention may be any combination of the above embodiment and modifications.

A data converting apparatus pertaining to the present invention is applicable for use in confidential communication, authentication, copyright protection, etc. via a network, and is well-suited to mobile terminal apparatuses, digital household electronics, etc. that require high scrambling performance and compact hardware.

The invention claimed is:

1. An encryption processing apparatus that encrypts n-bit input data with use of pre-provided key data, comprising:
   an input data converting unit operable to generate n-bit converted data constituted from a first block group including one or more data blocks and a second block group including one or more data blocks, by converting the input data with use of the pre-provided key data;
   at least one processor configured to operate as a first combining unit operable to generate a third block group with use of the second block group by, for each of the one or more data blocks in the second block group, XORing the data block with a duplicated data block duplicated from among the one or more data blocks in the first block group;
   a scramble unit operable to generate a fourth block group with use of the first block group and generate a fifth block group with use of the third block group by, for each of the one or more data blocks in the first block group and each of the one or more data blocks in the third block group, duplicating the data blocks to generate two or more duplicated data blocks, shift-rotating each duplicated data block to generate a shifted data block, and XORing the shifted data blocks together;

a second combining unit operable to generate a sixth block group with use of the fourth block group by, for each of the one or more data blocks in the fourth block group, XORing the data block with a duplicated data block duplicated from among the one or more data blocks in the fifth block group; and an output unit operable to output n-bit output data, the output data including the data blocks in the fifth block group and the data blocks in the sixth block group.

2. The encryption processing apparatus of claim 1, wherein the scramble unit duplicates data blocks to generate an odd number of data blocks, and shift-rotates each of the odd number of data blocks by a different number of bits.

3. The encryption processing apparatus of claim 1, wherein the number of data blocks in the first block group is equal to the number of data blocks in the second block group, and for each of the data blocks in the second block group, the first combining unit XORs the data block with the duplicated data block duplicated from among the one or more data blocks in the first block group.

4. The encryption processing apparatus of claim 1, wherein for each of the data blocks in the first block group and each of the data blocks in the third block group, the scramble unit duplicates the data blocks to generate two or more duplicated data blocks.

5. The encryption processing apparatus of claim 1, wherein for each of the data blocks in the fourth block group, the second combining unit XORs the data block with the duplicated data block duplicated from among the one or more data blocks in the fifth block group.

6. The encryption processing apparatus of claim 1, wherein in the second combining unit, one of the fourth data block group and one of the fifth data block group are XORed and are generated using different data blocks from each of the data block groups.

7. The encryption processing apparatus of claim 1, wherein a key converting unit generates converted data by combining the pre-provided key data and the input data together by one of an exclusive OR operation and an arithmetic addition operation.

8. The encryption processing apparatus of claim 1, further comprising:

a final scramble unit operable to, before the output unit outputs the output data, duplicate the output data to generate two or more duplicated output data blocks, shift-rotate each duplicated output data block to generate a shifted output data block, and XOR the shifted output data blocks together.

9. A data converting method used in an encryption processing apparatus that encrypts n-bit input data with use of pre-provided key data, the encryption processing apparatus including an input data converting unit, a first combining unit, a scramble unit, a second combining unit, and an output unit, the data converting method comprising the steps of:

generating n-bit converted data constituted from a first block group including one or more data blocks and a second block group including one or more data blocks, by causing the input data converting unit to convert the input data with use of the pre-provided key data:

generating a third block group with use of the second block group by causing the first combining unit to, for each of the one or more data blocks in the second block group, XOR the data block with a duplicated data block duplicated from among the one or more data blocks in the first block group, generating a fourth block group with use of the first block group and generating a fifth block group with use of the third block group by causing the scramble unit to, for each of the one or more data blocks in the first block group and each of the one or more data blocks in the third block group, duplicate the data blocks to generate two or more duplicated data blocks, shift-rotate each duplicated data block to generate a shifted data block, and XOR the shifted data blocks together;

generating a sixth block group with use of the fourth block group by causing the second combining unit to, for each of the one or more data blocks in the fourth block group, XOR the data block with a duplicated data block duplicated from among the one or more data blocks in the fifth block group; and outputting n-bit output data by causing the output unit to output the output data, the output data including the data blocks in the fifth block group and the data blocks in the sixth block group.

10. A non-transitory computer-readable recording medium storing a data converting program used in an encryption processing apparatus that encrypts n-bit input data with use of pre-provided key data, the encryption processing apparatus including an input data converting unit, a first combining unit, a scramble unit, a second combining unit, and an output unit, the data converting program causing the encryption processing apparatus to perform the steps of:

generating n-bit converted data constituted from a first block group including one or more data blocks and a second block group including one or more data blocks, by causing the input data converting unit to convert the input data with use of the pre-provided key data;

generating a third block group with use of the second block group by causing the first combining unit to, for each of the one or more data blocks in the second block group, XOR the data block with a duplicated data block duplicated from among the one or more data blocks in the first block group;

generating a fourth block group with use of the first block and generating a fifth block group with use of the third block group by causing the scramble unit to, for each of the one or more data blocks in the first block group and each of the one or more data blocks in the third block group, duplicate data blocks to generate two or more duplicated data blocks, shift-rotate each duplicated data block to generate a shifted data block, and XOR the shifted data blocks together;

generating a sixth block group with use of the fourth block second combining unit to, for each of the one or more data blocks in the fourth block group, XOR the data block with a duplicated data block duplicated from among the one or more data blocks in the fifth block group; and outputting n-bit output data by causing the output unit to output the output data, the output data including the data blocks in the fifth block group and the data blocks in the sixth block group.

11. An integrated circuit used in an encryption processing apparatus that includes a data converting unit encrypts n-bit input data with use of pre-provided key data, the integrated circuit comprising:

an input data converting unit operable to generate n-bit converted data constituted from a first block group including one or more data blocks and a second block group including one or more data blocks, by converting the input data with use of the pre-provided key data;

at least one processor configured to operate as a first combining unit operable to generate a third block group with use of the second block group by, for each of the one or more data blocks in the second block group, XORing the data block with a duplicated data block duplicated from among the one or more data blocks in the first block group;

a scramble unit operable to generate a fourth block group with use of the first block group and generate a fifth block group with use of the third block group by, for each of the one or more data blocks in the first block group and each of the one or more data blocks in the third block group, duplicating the data blocks to generate two or more duplicated data blocks, shift-rotating each duplicated data block to generate a shifted data block, and XORing the shifted data blocks together;

a second combining unit operable to generate a sixth block group with use of the fourth block group by, for each of the one or more data blocks in the fourth block group, XORing the data block with a duplicated data block duplicated from among the one or more data blocks in the fifth block group; and an output unit operable to output n-bit output data, the output data including the data blocks in the fifth block group and the data blocks in the sixth block group.

* * * * *